United States Patent [19]
Dickerson et al.

[11] Patent Number: 5,946,449
[45] Date of Patent: Aug. 31, 1999

[54] PRECISION APPARATUS WITH NON-RIGID, IMPRECISE STRUCTURE, AND METHOD FOR OPERATING SAME

[75] Inventors: Stephen Lang Dickerson; Wayne J. Book, both of Atlanta; Nader Sadegh, Marietta, all of Ga.

[73] Assignee: Georgia Tech Research Corporation, Atlanta, Ga.

[21] Appl. No.: 08/832,391

[22] Filed: Apr. 2, 1997

Related U.S. Application Data

[60] Provisional application No. 60/014,909, Apr. 5, 1996.

[51] Int. Cl.$^6$ ................................................. G05B 19/404
[52] U.S. Cl. .................. 395/95; 364/148.1; 364/167.07; 395/85; 395/901; 901/45
[58] Field of Search .............................. 364/151, 167.07, 364/167.09, 167.02, 176, 148.09, 148.1; 395/80, 85, 94, 95, 901; 901/45; 318/568.16, 568.23, 632

[56] References Cited

U.S. PATENT DOCUMENTS

| | | | |
|---|---|---|---|
| 2,801,351 | 7/1957 | Calvert et al. | 307/149 |
| 4,603,284 | 7/1986 | Perzley | 318/632 X |
| 4,616,326 | 10/1986 | Meier et al. | 364/513 |
| 4,618,938 | 10/1986 | Sandland et al. | 364/552 |
| 4,860,215 | 8/1989 | Seraji | 364/163 X |
| 4,916,635 | 4/1990 | Singer et al. | 364/513 |
| 4,977,494 | 12/1990 | Gabaldon et al. | 364/167.1 |
| 4,990,840 | 2/1991 | Migda | 318/571 |
| 4,998,206 | 3/1991 | Jones et al. | 364/468 |
| 5,049,797 | 9/1991 | Phillips | 395/93 X |
| 5,206,930 | 4/1993 | Ishikawa et al. | 395/95 |
| 5,220,262 | 6/1993 | Kneifel, II et al. | 318/569 |
| 5,255,199 | 10/1993 | Barkman et al. | 364/474 |
| 5,315,526 | 5/1994 | Maeda et al. | 364/474 |
| 5,453,933 | 9/1995 | Wright et al. | 364/474 |
| 5,546,508 | 8/1996 | Jain et al. | 395/95 |
| 5,594,309 | 1/1997 | McConnell et al. | 364/474.19 X |

OTHER PUBLICATIONS

A. Miyakawa, S. Hata et al.; A Flexible Assembly Station With Visual Sensors; IECON '84; vol. 2; 84 CH 1991–9; pp. 1036–1040; Oct. 1984.

Anton T.J.M. Smals; Sensing In Robotic Control—Economy Vision; Elsevier Science Publishers B.V. (North Holland) Robotics, 1987; pp. 175–180.

EK Teoh et al.; An Intelligent Robotic Vision System–Automatic Keyboard Assembly; IEEE School of Electrical & Electronic Engineering; 1987; pp. 550–554.

(List continued on next page.)

*Primary Examiner*—Joseph Ruggiero
*Attorney, Agent, or Firm*—Thomas, Kayden, Horstemeyer & Risley, L.L.P.

[57] ABSTRACT

An apparatus which allows one to maintain precision placement of a manipulator which undergoes repeated controlled motions or trajectories is provided. The structure of the apparatus is compliant such that the manipulator may be displaced by forces applied to the mechanical structure. This compliance is due to a lack of precision in the fabrication of the component parts of the machine, and to a lack of rigidity due to a lightweight design. This displacement is of a greater magnitude than the precision positioning tolerance of the apparatus. Consequently, the manipulator may then be displaced outside of the positioning tolerance due to applied forces. However, it is a characteristic of the present invention, that despite the compliance of the mechanical structure of the apparatus, the positioning tolerance will be maintained. The controlled motion is accomplished by the generation of control signals by computer software running on a computer control system. The control software enables the system to run at much greater speeds while not exciting unwanted movement or vibration in the compliant mechanical structure.

36 Claims, 16 Drawing Sheets

OTHER PUBLICATIONS

Sadegh, N., and Guglielmo, K., "Design and Implementation of Adaptive and Repetitive Controllers for Mechanical Manipulators," *IEEE Transactions on Robotics and Automation*, vol. 8, No. 3, Jun. 1992.

Feddema, J.T., "Digital Filter Control of Remotely Operated Flexible Robotic Structures," *Proceedings of the ANS Fifth Topical Meeting on Robotics and Remote Systems*, vol. 1, Knoxville, TN, Apr. 25–30, 1993, pp. 259–264.

Gorbatenko, G.G., "Posicast Control by Delayed Gain," *Control Engineering*, vol. 12, No. 2, Feb. 1965, pp. 74–77.

Hillsley, K.L. and Yurkovich, S., "Vibration Control of a Two–Link Flexible Robot Arm," *Proceedings of the IEEE International Conference on Robotics and Automation*, vol. 3, Sacramento, CA, Apr. 9–11, 1991, pp. 2121–2126.

Huang, S.J. and Lian, R.J., "Active Optimal Vibration Control for a Lumped System," *Computers & Structures*, vol. 51, No. 6, Jun. 17, 1994, pp. 749–862.

Hyde, J.M. and Seering, W.P., "Using Input Command Pre–Shaping to Suppress Multiple Mode Vibration," *Proceedings of the IEEE International Conference on Robotics and Automation*, vol. 3, Sacramento, CA, Apr. 9–11, 1991, pp. 2604–2609.

Hyde, J.M. and Seering, W.P., "Inhibiting Multiple Mode Vibration in Controlled Flexible Systems," *Proceedings of the American Control Conference*, vol. 3, Boston, MA, Jun. 26–28, 1991, pp. 2449–2454.

Johnson, C.R., Jr., "On the Interaction of Adaptive Filtering, Identification, and Control," *IEEE Signal Processing Magazine*, vol. 12, No. 2, Mar. 1995, pp. 22–37.

Khorrami, F., Jain, S., and Tzes, A., "Experiments on Rigid Body Based Controllers with Input Preshaping for a Two–Link Flexible Manipulator," *Proceedings of the American Control Conference*, vol. 4, Chicago, IL, Jun. 24–26, 1992, pp. 2957–2961.

Khorrami, F., Jain, S., and Tzes, A., "Experimental Results on Adaptive Nonlinear Control and Input Preshaping for Multi–Link Flexible Manipulators," *Automatica*, vol. 31, No. 1, Jan. 1995, pp. 83–97.

Magee, D.P., *Dynamic Control Modification Techniques in Teleoperation of a Flexible Manipulator*, M.S. Thesis, Georgie Institute of Technology, Nov. 1991.

Magee, D.P. and Book, W.J., "The Application of Input Shaping to a System with Varying Parameters," *Proceedings of the Japan/USA Symposium on Flexible Automation*, vol. 1, San Francisco, CA, Jul. 13–15, 1992, pp. 519–526.

Magee, D.P. and Book, W.J., "Experimental Verification of Modified Command Shaping Using a Flexible Manipulator," *Proceedings of the First International Conference on Motion and Vibration Control*, vol. 1, Yokohama, Japan, Sep. 7–11, 1992, pp. 553–558.

Magee, D.P. and Book, W.J., "Eliminating Multiple Modes of Vibration in a Flexible Manipulator," *Proceedings of the IEEE International Conference on Robotics and Automation*, vol. 2, Atlanta, GA, May 2–6, 1993, pp. 474–479.

Magee, D.P. and Book, W.J., "Implementing Modified Command Filtering to Eliminate Multiple Modes of Vibration," *Proceedings of the American Control Conference*, vol. 3, San Francisco, CA, Jun. 2–4, 1993, pp. 2700–2704.

Magee, D.P. and Book, W.J., "Filtering Schilling Manipulator Commands to Prevent Flexible Structure Vibration," *Proceedings of the American Control Conference*, vol. 3, Baltimore, MA, Jun. 29–Jul. 1, 1994, pp. 2538–2542.

Magee, D.P. and Book, W.J., "Filtering Micro–Manipulator Wrist Commands to Prevent Flexible Base Motion," *Proceedings of the American Control Conference*, vol. 1, Seattle, WA, Jun. 21–23, 1995, pp,. 924–928.

Magee, D.P., *Optimal Arbitrary Time–delay Filtering to Minimize Vibration in Elastic Manipulator Systems*, Ph.D. Thesis, Georgia Institute of Technology, Aug. 1996.

Magee, D.P., Cannon, D.W. and Book, W.J., "Combined Command Shaping and Inertial Damping for Flexure Control," *Proceedings of the American Control Conference*, vol. 3, Albuquerque, NM, Jun. 4–6, 1997, pp. 1330–1334.

Masri, S.F., Bekey, G.A., and Caughey, T.K., "Optimum Pulse Control of Flexible Structures," *ASME Journal of Applied Mechanics*, vol. 48, No. 3, Sep. 1981, pp. 619–626.

Murphy, B.R. and Watanabe, I., "Digital Shaping Filters for Reducing Machine Vibration," *IEEE Transactions on Robotics and Automation*, vol. 8, No. 2, Apr. 1992, pp. 285–289.

Rappole, B.W., Jr., Singer, N.C., and Seering, W.P., "Input Shaping with Negative Sequences for Reducing Vibrations in Flexible Structures," *Proceedings of the American Control Conference*, vol. 3, San Francisco, CA, Jun. 2–4, 1993, pp. 2695–2699.

Rattan, K.S. and Feliu, V., "Feedforward Control of Flexible Manipultors," *Proceedings of the IEEE National Aerospace and Electronics Conference*, vol. 3, Dayton, OH, May 20–24, 1991, pp. 1084–1089.

Rattan, K.S. and Feliu, V., "Feedforward Control of Flexible Manipulators," *Proceedings of the IEEE International Conference on Robotics and Automation*, vol. 1, Nice, France, May 12–14, 1992, pp. 788–793.

Sayed, A.H. and Kailath, T., "A State–Space Approach to Adaptive RLS Filtering," *IEEE Signal Processing Magazine*, vol. 11, No. 3, Jul. 1994, pp. 18–60.

Singer, N.C., *Residual Vibration Reduction in Computer Controlled Machines*, Ph.D. Thesis, Massachusetts Institute of Technology, Feb. 1989.

Singer, N.C. and Seering, W.P., *Preshaping Command Inputs to Reduce System Vibration*, Artificial Intelligence Memo No. 1027, Massachusetts Institute of Technology, Jan. 1988.

Singer, N.C. and Seering, W.P., "Preshaping Command Inputs to Reduce System Vibration," *ASME Journal of Dynamic Systems, Measurement, and Control*, vol. 112, No. 1, Mar. 1990, pp. 76–82.

Singer, N.C. and Seering, W.P., "An Extension of Command Shaping Methods for Controlling Residual Vibration using Frequency Sampling," *Proceedings of the IEEE International Conference of Robotics and Automation*, vol. 1, Nice, France, May 12–14, 1992, pp. 800–805.

Singh, T. and Heppler, G.R., "Shaped Inputs for a Multimode System", *Proceedings of the IEEE International Conference on Robotics and Automation*, vol. 3, Atlanta, GA, May 2–6, 1993, pp. 484–489.

Singh, T. and Vadali, S.R. "Robust Time–Delay Control," *ASME Journal of Dynamic Systems, Measurement, and Control*, vol. 115, No. 2A, Jun. 1993, pp. 303–306.

Singh, T. and Vadali, S.R., "Robust Time–Delay Control of Multimode Systems", *Proceedings of the American Control Conference*, vol. 1, Baltimore, MD, Jun. 29–Jul. 1, 1994, pp. 681–685.

Singhose, W.E., Seering, W.P. and Singer, N.C., "Shaping Inputs to Reduce Vibration: A Vector Diagram Approach," *Proceedings of the IEEE International Conference on Robotics and Automation,* vol. 2, Cincinnati, OH, May 13–18, 1990, pp. 922–927.

Singhose, W.E., Singer, N.E., and Seering, W.P., "Design and Implementation of Time–Optimal Negative Input Shapers," *Dynamic Systems and Control,* DSC–vol. 55–1, 1994 ASME Winter Annual Meeting, Chicago, IL, Nov. 6–11, 1994, pp. 151–157.

Singhose, W.E., Porter, L.J., and Singer, N.C., "Vibration Reduction Using Multi–Hump Extra–Insensitive Input Shapers," *Proceedings of the American Control Conference,* vol. 5, Seattle, WA, Jun. 21–23, 1995, pp. 3830–3834.

Singhose, W.E., Seering, W.P. and Singer, N.C., "Time–Optimal Negative Input Shapers," *ASME Journal of Dynamic Systems, Measurement, and Control,* vol. 119, No. 2, Jun. 1997, pp. 198–205.

Smith, O.J.M., *Feedback Control Systems,* McGraw–Hill Book Company, Inc., New York, 1958.

Tallman, G.H. and Smith, O.J.M., "Analog Study of Dead–Beat Posicast Control," *IRE Transactions on Automatic Control,* vol. PGAC, No. 4, Mar. 1958, pp. 14–21.

Tuttle, T.D. and Seering, W.P., "A Zero–Placement Technique for Designing Shaped Inputs to Suppress Multiple–mode Vibration," *Proceedings of the American Control Conference,* vol. 3, Baltimore, MD, Jun. 29–Jul. 1, 1994, pp. 2533–2537.

Tuttle, T.D., and Seering, W.P., "Deriving and Verifying Time–Optimal Commands for Linear Systems," *Proceedings of the American Control Conference,* vol. 3, Albuquerque, NM. Jun. 4–6, 1997, pp. 1325–1329.

Tzes, A. and Yurkovich, S., "An Adaptive Input Shaping Control Scheme for Vibration Suppression in Slewing Flexible Structures," *IEEE Transactions on Control Systems Technology,* vol. 1, No. 2, Jun. 1993, pp. 114–121.

Yurkovich, S., Tzes, A.P., and Hillsley, K.L., "Controlling Coupled Flexible Links Rotating in the Horizontal Plane," *Proceedings of the American Control Conference,* vol. 1, San Diego, CA, May 23–25, 1990, pp. 362–367.

PRECISION APPARATUS WITH NON-RIGID, IMPRECISE STRUCTURE, AND METHOD FOR OPERATING SAME

CROSS REFERENCE TO RELATED APPLICATION

The subject matter of this document claims priority to co-pending and commonly assigned U.S. provisional patent application entitled, "LOW COST, HIGH RELIABILITY ROBOTIC ASSEMBLY APPARATUS," filed Apr. 5, 1996 and accorded Ser. No. 60/014,909. The foregoing document is incorporated herein by reference.

TECHNICAL FIELD

This invention relates generally to the field of the controlled motion of mechanical devices and, more particularly, to robotic machines of low machine precision and weight, but high precision and speed, for performing repeated operations.

BACKGROUND OF THE INVENTION

Many industries in which finished products are assembled from components have, over the past decade, made use of robotic assembly machines. The use of robots has been prevalent in a wide variety of applications ranging from automobile assembly to the assembly of electronic circuit boards and many other consumer products. In general, robotic assembly machines have traditionally been very expensive and heavy because of the precision, accuracy, and continuous duty cycle requirements placed upon them. Many robotic assembly machines have a cantilevered arm that can swing around to pick up components and then swing back to install the components on the product being assembled. Some machines are "blind" in that they are programmed to move in a certain precise way without any feedback regarding the location of the components they are working on. With these machines, both their precision and the precision and placement of components parts and of the products being assembled must be high and carefully controlled. Otherwise, the robot will miss a component or misplace the component on the finished product.

The need for inexpensive, yet accurate and reliable robot assembly machines is the result of ordinary economics. When American manufacturers assemble products, they generally compete in a world market that often has an effective wage rate of less than $5.00 per day, including fringe benefits and overhead. Thus, in some instances, it may be more economical to hire several third world workers to do the job of one robot. However, if such robots could be manufactured relatively inexpensively, yet with operation precision, accuracy, speed and reliability akin to the performance of more expensive robots, many assembly markets where robots have not been feasible would become open to use of such robots. In general, a machine cost of $20,000 or less would be considered a good target for a general purpose assembly robot.

Thus, it is seen that a continued need exists for an inexpensive machines with imprecise construction and low weight requirements yet that performs assembly with high precision and high speed. It is to the provision of such a robotic assembly machine that this invention is primarily directed, however, the present invention also applies to any type of application such as machine operations, machining and other controlled motion processes.

SUMMARY OF THE INVENTION

Briefly described, the invention provides for a non-rigid, precision placement machine and method for assembling components into a finished product. The machine comprises an overhead linear motor or equivalent track drive system upon which a traveling head is mounted. The head can be moved along the linear motor to a desired location. A pallet on which the product being assembled is positioned is located on rails that extend beneath the linear motor and head. The tracks extend at right angles to the motion of the head. The head is adapted to be moved along the linear motor in the x direction and the pallet is adapted to be moved along the rails in a y direction. The head is also provided with up and down or z direction motion, if necessary.

A plurality of parts or component trays or feeders are located on both sides of the tracks beneath the linear motor. The head is adapted to be moved along the track to overlay a particular parts tray, retrieve a part from the tray, and move back to a position overlying the pallet, where the head installs the part on the products being assembled. In order to reduce the required precision of the drives and tracks, the invention makes use of integrated vision units that judge, using imaging devices, the relative positions of the heads, component parts, and products being assembled. Further, since components being picked up and carried by the head are suspended directly beneath the head itself, the entire assembly can be made lighter than traditional robots with cantilevered arms. In addition, the amplification or accumulation of movement errors that is inherent in a long robotic arm is virtually eliminated in the present invention.

In addition, the apparatus disclosed is controlled via a computer control system which operates according to control software. The control software includes a module for movement trajectory generation as well as a module for filtering of the movement trajectory to minimize unwanted system dynamics. Also, a learning module is included that allows the system to adapt to repeated errors experienced in repeated motions. The present invention includes apparatus and methods by which the above modules are implemented.

Thus, a greatly improved robotic assembly machine is now provided that is lighter, demands less machine precision, is less expensive, and yet that is as accurate and reliable as heavy expensive prior art assembly robots. Also, the present invention will enable operation at an increased bandwidth with reduced error than as seen by conventional control systems.

These and other features, objects, and advantages of the invention will become more apparent upon review of the detailed description set forth below in conjunction with the accompanying drawings, which are briefly described as follows.

BRIEF DESCRIPTION OF THE DRAWINGS

The invention can be better understood with reference to the following drawings. The components in the drawings are not necessarily to scale, emphasis instead being placed upon clearly illustrating principles of the present invention. In the drawings, like reference numerals designate corresponding parts throughout the several views.

DESCRIPTION OF THE PREFERRED EMBODIMENT

Figure 1:
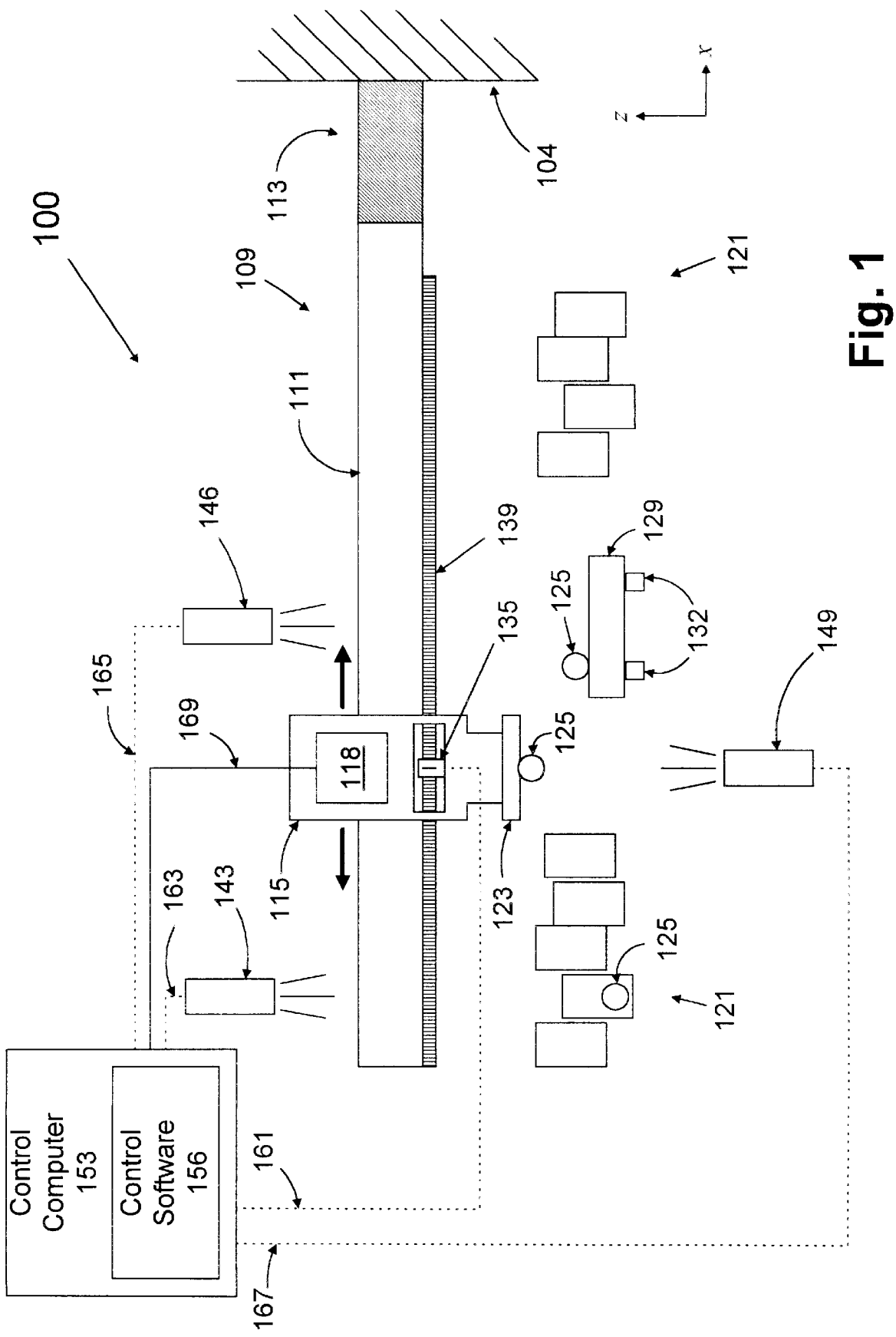
FIG. 1 is a schematic view of the non-rigid, precision placement machine with imprecise structure and the control system of the preferred embodiment.

FIG. 1 shows an overview of the preferred embodiment of a non-rigid, precision placement machine 100 of imprecise construction according to the instant invention. Shown is a rigid body 104 which contacts a non-rigid support structure 109 which is composed of an x-direction beam 111 and other structure not shown. The support structure 109 is connected to the rigid body 104 by a section representing the compliance 113 of the total support structure, a term which will be defined later. Rigid body 104 may be the ground, such as a shop floor, or any other suitable surface to which the support structure 109 may be affixed. Head 115 is moveably affixed to the beam 111 and can move along the length of the beam 111 in either direction. The force by which head 115 is moved along the length of beam 111 is generated by motor 118. An end effector 123 is attached to the head 115.

Part feeders 121 are located under beam 111 and contain parts 125 to be assembled on assembly platform 129. Part feeders 121 are disposed at variable heights so as to minimize the distance from a part 125 disposed in the part feeders 121 to the head 115. Assembly platform 129 translates in a direction perpendicular to that of head 115 on rails 132.

Position encoder 135, disposed on head 115, senses feedback tape 139 which is disposed along the length of the beam 111, generating position data based on the information that the encoder 135 senses on the feedback tape 139. Also, position feedback data is received from first, second, and third vision cameras 143, 146 and 149 which are disposed in positions so as to face the part bins 121, the assembly 129, and the head 115.

The overall operation of the non-rigid, precision placement machine 100 is determined by the control computer 153 operating according to control software 156 which runs on control computer 153. The control computer 153 is in electrical communication with the position feedback devices, such as encoder 135, via the feedback communications cable 161. Control computer 153 is also in electrical communications with first, second, and third vision cameras 143, 146 and 149 via first, second, and third vision communications cables 163, 165 and 167, respectively. Control computer 153 also directs the motion of head 115 by sending control signals that actuate motor 118 through power cable 169. A top view of the non-rigid precision placement machine 100 is shown in FIG. 2.

Figure 2:
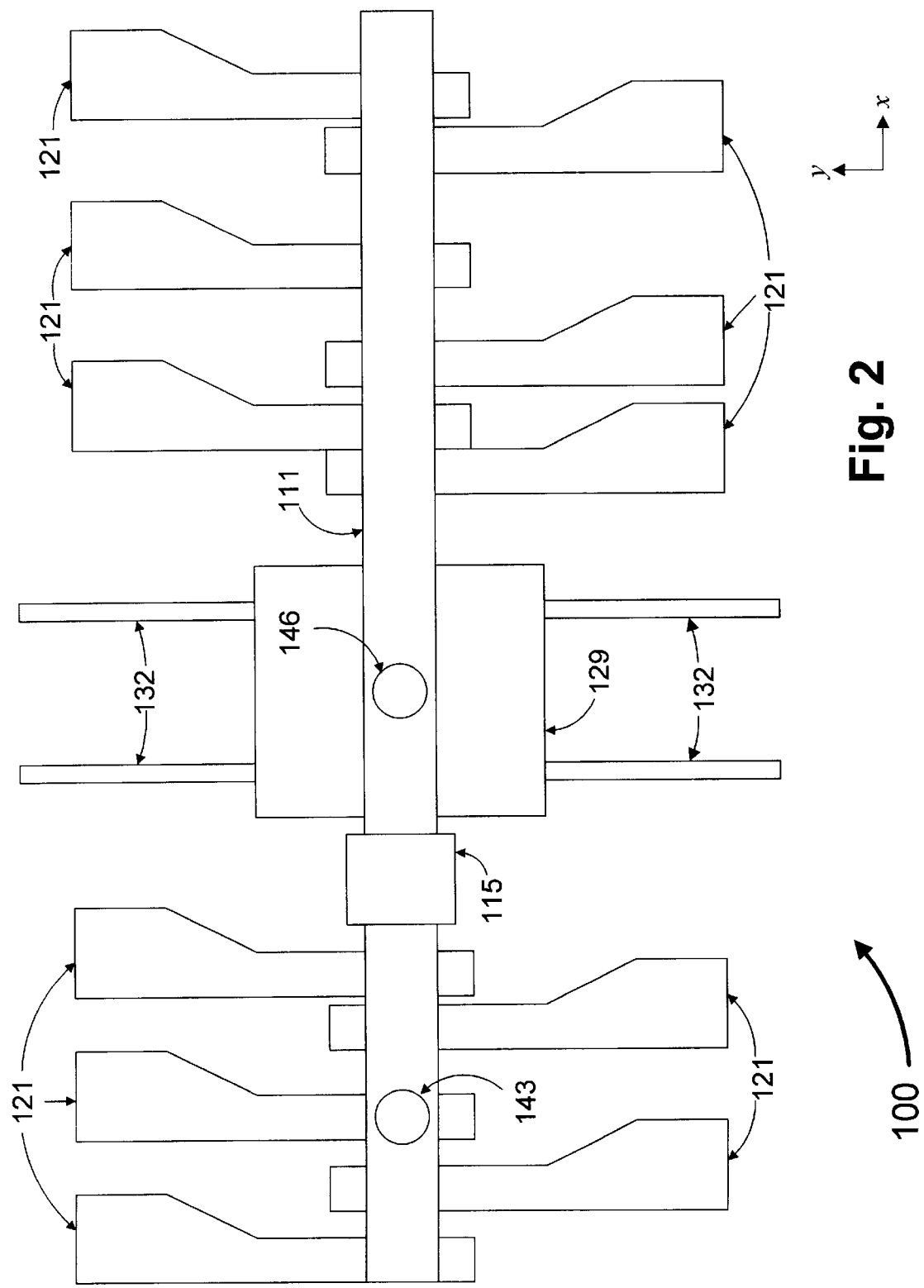
FIG. 2 is a top view of the machine of FIG. 1.

To describe the operation of the assembly shown in FIGS. 1 and 2, control computer 153, operating pursuant to control software 156, will cause the head 115 to move over to a part feeder 120 and pick up a part 125. The head 115 will then be similarly directed to carry the part 125 over to the assembly platform 129 and perform the assembly task with the part 125. The encoder 135 sensing the feedback tape 139 and vision cameras 143, 146 and 149 will provide position feedback information to the control computer 153 which is used by the control software 156 to guide the location of the head 115 placing it within a predetermined positioning tolerance.

The support structure 109 includes both the support beam 111, and any moving parts which are related to the movement of the head 115 as well as parts making up the head 115 itself. The component parts which make up the support structure 109 are made to dimensional tolerances that are generally greater than the positioning tolerance previously mentioned. In addition, the support structure 109 is generally non-rigid such that a certain amount of movement is possible due to applied forces and inertial forces, such forces being generally known to those skilled in the art. The possible deflection of the position of a part 125 or end effector 123 attached to the head 115 due to applied and inertial forces and both the dimensional tolerances of component parts and the non-rigid nature of the support structure 109 is termed the compliance 113 of the support structure 109. It is a characteristic of the present invention that even though the compliance 113 of the support structure 109 is greater than the precise positioning tolerance of the head 115, the position tolerance of the head 115 will be maintained. The various aspects of the non-rigid, precision placement machine 100 including the control software 156 will now be discussed.

Support Structure

Figure 3:
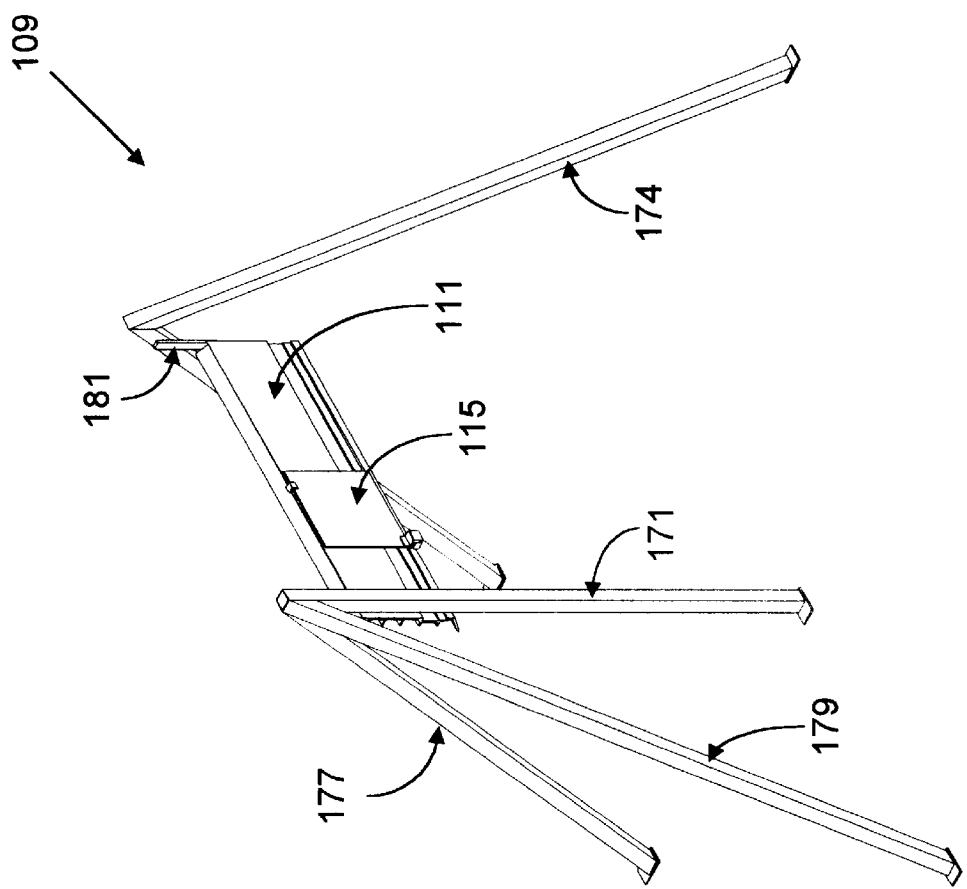
FIG. 3 is a perspective view of the support structure with the head and beam of the preferred embodiment of the machine of FIG. 1.

Turning to FIG. 3, the particular support structure 109 of the preferred embodiment is shown. The support structure 109 includes a vertical support 171 and an A-frame 174. Side brace 177 is fastened to vertical support 171 by a weld joint, however, bolts, fasteners or other means may be used to connect vertical support 171 and side brace 177. Also connected to the vertical support 171 is triangular brace 179 which may be connected the vertical support 171 in the same manner as side brace 177.

Disposed between the vertical support 171 and the A-frame 174 is beam 111. The beam 111 is connected to vertical support 171 by a weld, but may also be attached using bolts or other fastening methods. The beam 111 is connected to the A-frame via extension member 181. The extension member 181 is bolted to the A-frame 174 and the beam 111, but may also be attached to these members by welding or other fastening methods.

The support structure 109 of the preferred embodiment shown in FIG. 3 has several unique characteristics. First, the support structure 109 is of an imprecise, lightweight design which translates into a lack of rigidity. Thus, the imprecise, lightweight support structure 109 will deform when mechanical energy is translated to it. For example, the support structure 109 may deform due to the fact that only a single triangular brace 179 is employed to prevent motion of the support structure 109 in the direction of the axis of beam 111.

Also, only five points of contact exist between the support structure 109 and the ground. In particular, the vertical support 171, side brace 177 and the triangular brace 179 are employed to hold up one end of the beam 111, while the other end of beam 111 is held up by A-frame 174. Thus there are no more than three points contacting the ground to support each side of the beam 111. Consequently, the ground need not be perfectly smooth, nor will there need to be any adjustments made to the support structure 109 to firmly place the support structure 109 in position for operation. Thus, the installation of the support structure 109 is made simple and cost effective.

Additionally, the components of the support structure 109 are made of standard tube stock, beams, or plates that are readily available in industry. The use of such imprecise, lightweight materials contrasts with the more massive parts characteristic of prior art precision robots or machines. Often, such machines are made of heavy castings with precision machined surfaces that are unique components and can be very expensive to produce. The construction of precision machinery as illustrated by the prior art as such is an expedient will known to those skilled in the art. The imprecise, lightweight and less massive design of the support structure 109 using standard mechanical components translates into a significant cost savings.

The lightweight design of the precision placement machine 100 will thus translate into a very low machine weight to payload ratio as compared to prior art machines. In the case of the preferred embodiment, this ratio is generally a 1:1 correspondence between the parts 125 (FIG. 1) and the moveable parts on the precision placement machine 100, which in the case of the preferred embodiment is the head 115 and attached components.

The precision placement machine 100 will position the head 115 with a part 125 in a predetermined position within a predetermined tolerance, even though the support structure 109 will allow distortion of magnitude greater than the desired positioning tolerance. In the case of the preferred embodiment, this tolerance is within a few microns, or even a single micron. The lack of rigidity of the support structure 109 due to it's imprecise, lightweight design will allow oscillation, vibration or other movement of greater magnitude than the tolerance sought. In essence, although the whole support structure 109 can vibrate, oscillate or generally deform to a magnitude much greater than the positioning tolerance of the head 115, it is a feature of the preferred embodiment that the positioning tolerance will be maintained. Furthermore, the dimensional tolerances of the moving parts and other component parts of the support structure 109 are also greater than the positioning tolerance.

Head Assembly Portion of the Support Structure

Figure 4:
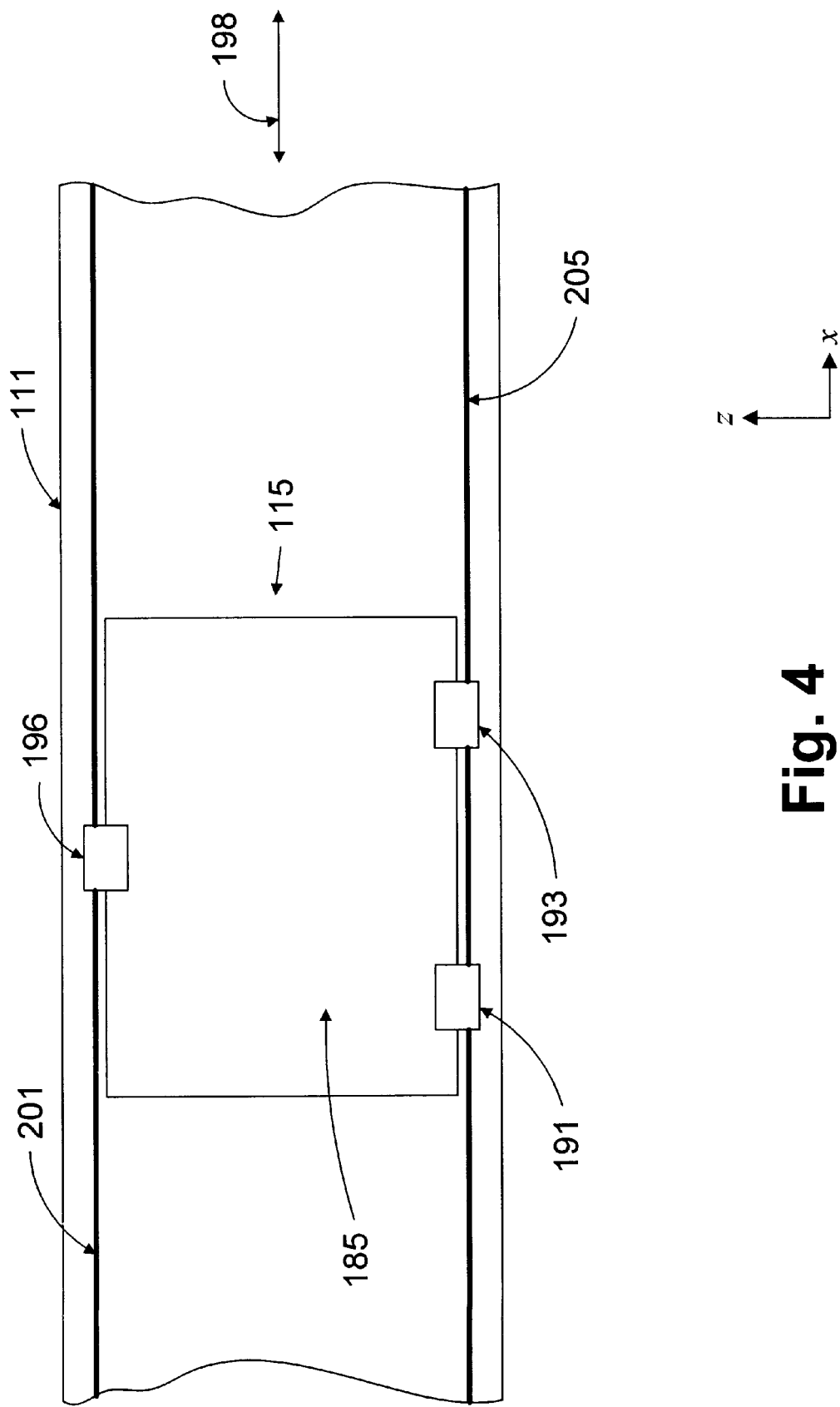
FIG. 4 is an exploded, partial view of the head as it is attached to the beam shown in FIG. 3.

Turning now to FIG. 4, illustrated is a section of beam 111 with the head 115. The head 115 is comprised of a head plate 185 which is moveably attached to the beam 111 with first and second two dimensional constraints 191 and 193, and single dimensional constraint 196. The first and second two dimensional contraints 191 and 193, and the single dimensional contraint 196 will restrain movement in five of six possible degrees of freedom. There are three linear and three axial degrees of freedom as understood by one skilled in the art. Thus, the plate may move along a single x-axis 198 which is the only remaining degree of freedom of the head 185 without constraint. The constraint of a moving body as such is an expedient well within the understanding of one skilled in the art.

The head 115 could also be termed a "manipulator" as it is the moveable portion of the support structure 109 which will manipulate parts or perform tasks. Such a manipulator may be in several other forms such as an arm on an assembly robot for example.

The three constraints mentioned previously are accomplished with the use of the x-axis single dimension track 201 which mates up with the x-axis single dimensional constraint 196, and the x-axis four dimension track 205 which will mate up with the first and second two dimensional constraints 191 and 193.

Figure 5:
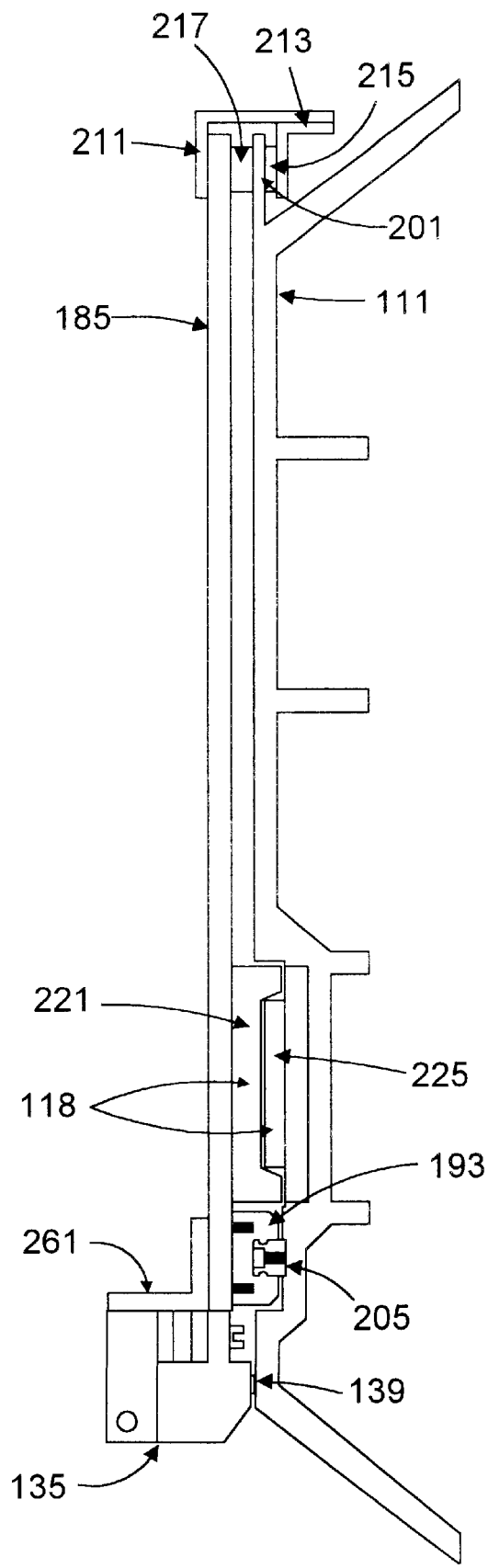
FIG. 5 is a side view of the head and beam assembly of FIG. 4 further including the encoder, bearings and linear motor.

Turning to FIG. 5, shown is a side view of the head 115 disposed on the beam 111. At the top of the beam 111 is the single dimension track 201. Attached to the top of head plate 185 is first L-brace 211. Attached to the first L-brace 211 is second L-brace 213. Connected to L-brace 213 is first sliding bearing 215 which slides along the smooth surface of the single dimensional track 201. The second sliding bearing 217 is attached to the surface of the head plate 185 and slides along the smooth surface of the x-axis single dimensional track 201 opposite the first sliding bearing 215. Together the first and second sliding bearings 215 and 217, and the first and second L-braces 211 and 213 make up the x-axis single dimensional constraint 196 (FIG. 4). The first and second sliding bearings 215 and 217 are made of materials that will allow free movement with a minimum of friction. These bearings are well known to those skilled in the art. Generally, alternatives to the sliding bearings 215 and 217 include recirculating ball bearing designs, air bearings or other types known to those skilled in the art.

In the preferred embodiment, the beam 111 is constructed from extruded aluminum with the single dimensional bearing 201 being an integral part. The beam 111 is generally constructed to a tolerance of 0.005 inches per foot, but may be many times the accuracy of the positioning tolerance of the head 115. Also, the single dimensional bearing 201 may be constructed separately and attached to the beam 185. The second sliding bearing 217 is lightly spring loaded in the preferred embodiment so as to be able to account for variations in the thickness of the single dimensional bearing 201. Note that the construction tolerance of the beam 111 is relatively easy to meet by those skilled in the field and therefor any costs normally necessary for precision construction is avoided by the present invention as precision construction is not necessary.

The four dimension track 205 is attached to the bottom of beam 111. The four dimension track 205 is mated with first and second two dimensional constraints 191 (not shown) and 193 and is of a recirculating ball bearing design known to those skilled in the art. The first constraint 193 is shown in front of the second constraint 191 which is not shown, both of which are attached to the head plate 185. The first and second two dimensional constraints 191 and 193 will slide along the four dimension track 205, and the first and second sliding bearings 215 and 217 will slide along the two dimensional track 201, allowing the head 115 to move. The tolerance to which the track 205 is constructed is approximately three microns, which is the tolerance available with conventional recirculating ball bearing tracks as known to those skilled in the art. Other similar track designs that could be employed include air bearings or sliding bearings as known to those skilled in the art. Also, the present invention will allow an imprecise alignment between tracks 201 and 205 to a significant degree, for example, up to one tenth of an inch. The lesser degree of precision necessary in the construction of these components translates into significant savings in the cost of construction.

Also shown in FIG. 5 is the side view of the moving coil motor 118, with armature 221 and stator magnets 225 that provide the force by which the head translates the length of the beam 111. In the preferred embodiment, the moving coil motor 118 is used as no attractive force is generated between the armature 221 and the stator magnets 225 which would add unwanted excitation and forces to the precision placement machine 100. Also, a moving coil motor is of an inherently light construction, further making their use desirable. However, it would be possible to use any type of AC or DC motor used in conjunction with a chain, band, belt, or turning screw design to accomplish the movement of the head 115 as known to those skilled in the art. Thus the moving coil motor 118 of the preferred embodiment is not used at the exclusion of any electric, hydraulic, pneumatic or other force generating means.

There is a single row of stator magnets 225 shown mounted to the beam 111 in close proximity to the armature 221. It would be possible to implement a design with a moving coil motor 118 that uses two rows of magnets instead of one.

Finally FIG. 5 provides a side view of beam 111. The construction of beam 111 is of the "C" shape such that it will resist torsional bending due to vertical forces. The preferred embodiment features this design so that any vertical force generated by the task will not cause unwanted deformation of the beam 111 such that rotation of the head 115 along the beam 111 does not occur. FIG. 5 also affords a view of the encoder 135 and the feedback tape 139.

Figure 6:
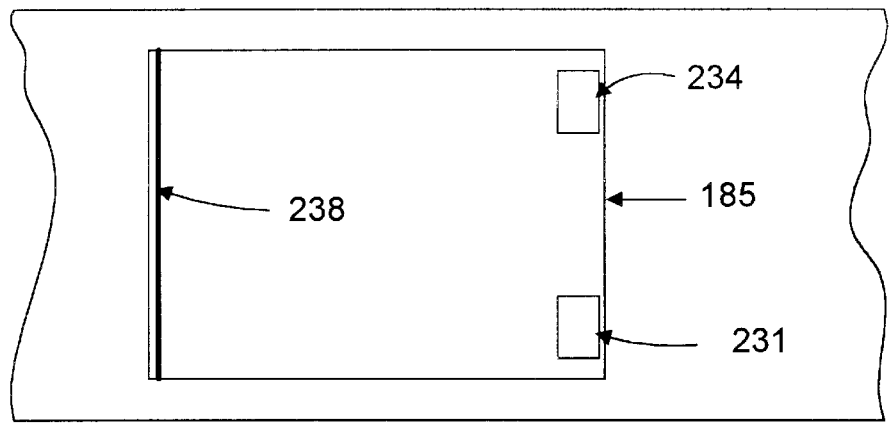
FIG. 6 is a view of the z-plate and the head and beam assembly of FIG. 5.

Referring to FIG. 6, shown is the beam 111 on which is disposed the head plate 185. Attached to the head plate 185 at one end are first and second z-axis two dimensional contraints 231 and 234, which are of identical construction. Attached in the vertical direction at the other end of the head plate 185 is z-axis single dimensional track 238. The z-axis constraints 231 and 234 are identical to the x-axis constraints 191 and 193 (FIG. 4). Likewise, the z-axis track 238 is identical in construction to the x-axis single dimensional track 201 (FIGS. 4 and 5).

Below the beam 111 in FIG. 6 is shown the z-axis plate 241 on which is disposed the z-axis four dimensional track 243. The z-axis track 243 is attached to the rear side of the z-axis plate 241 as shown in FIG. 6. The z-axis track 243 is identical to the x-axis four dimensional track 205 (FIGS. 4 and 5).

At the other end of z-axis plate 241 is disposed the z-axis single dimensional constraint 247 which is identical in construction with the x-axis single dimensional contraint 196 (FIGS. 4 and 5). At the bottom of the z-axis plate 241 is horizontal bracket 249 which provides a flat surface to which the payload 251 is attached. As was the case with the head 115, the z-plate 241 is restrained in five of six degrees of freedom as one skilled in the art understands.

Figure 7:
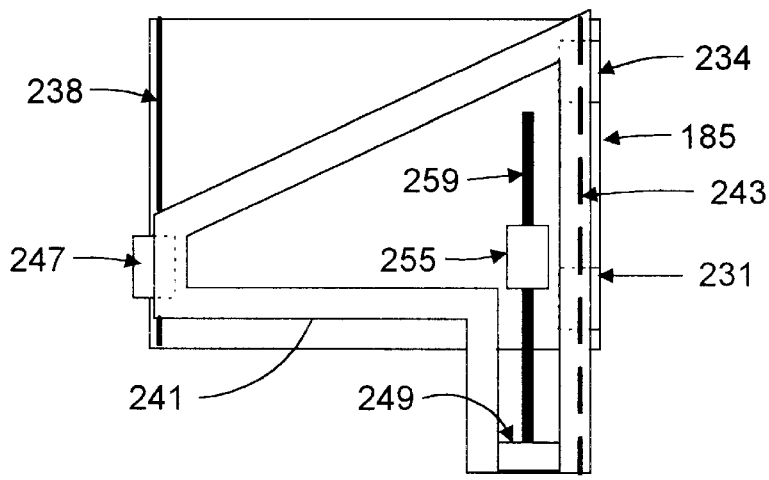
FIG. 7 is a view of the z-plate attached to the head of FIG. 6.

Turning to FIG. 7, shown is the z-plate 241 disposed on the head plate 185. In particular, restraints 231 and 234 are mated with z-axis four dimensional track 243. Likewise, the restraint 247 is mated with z-axis single dimensional track 238. Thus the z-plate can be moved up or down in the direction of the z-axis tracks 238 and 243. Also shown attached to the head plate 185 is the hollow armature motor 255 through which is disposed the core screw 259. The core screw is fastened to the horizontal bracket 249 via threaded end that is screwed into a threaded hole in the horizontal bracket 249. The hollow armature motor 255 is fit with a threaded interior nut that will spin when activated. This threaded nut will mate up with the core screw 259. The core screw 259 does not rotate, having been threaded into the horizontal bracket 249. When the hollow armature of the motor 255 spins, the core screw will be pulled through the motor. Since the z-plate 241 is attached to the core screw 259, it will move with the screw. Thus the z-plate 241 is moved up and down in such a fashion. The operation of a hollow armature motor 255 as such is well known by those skilled in the art.

Figure 8:
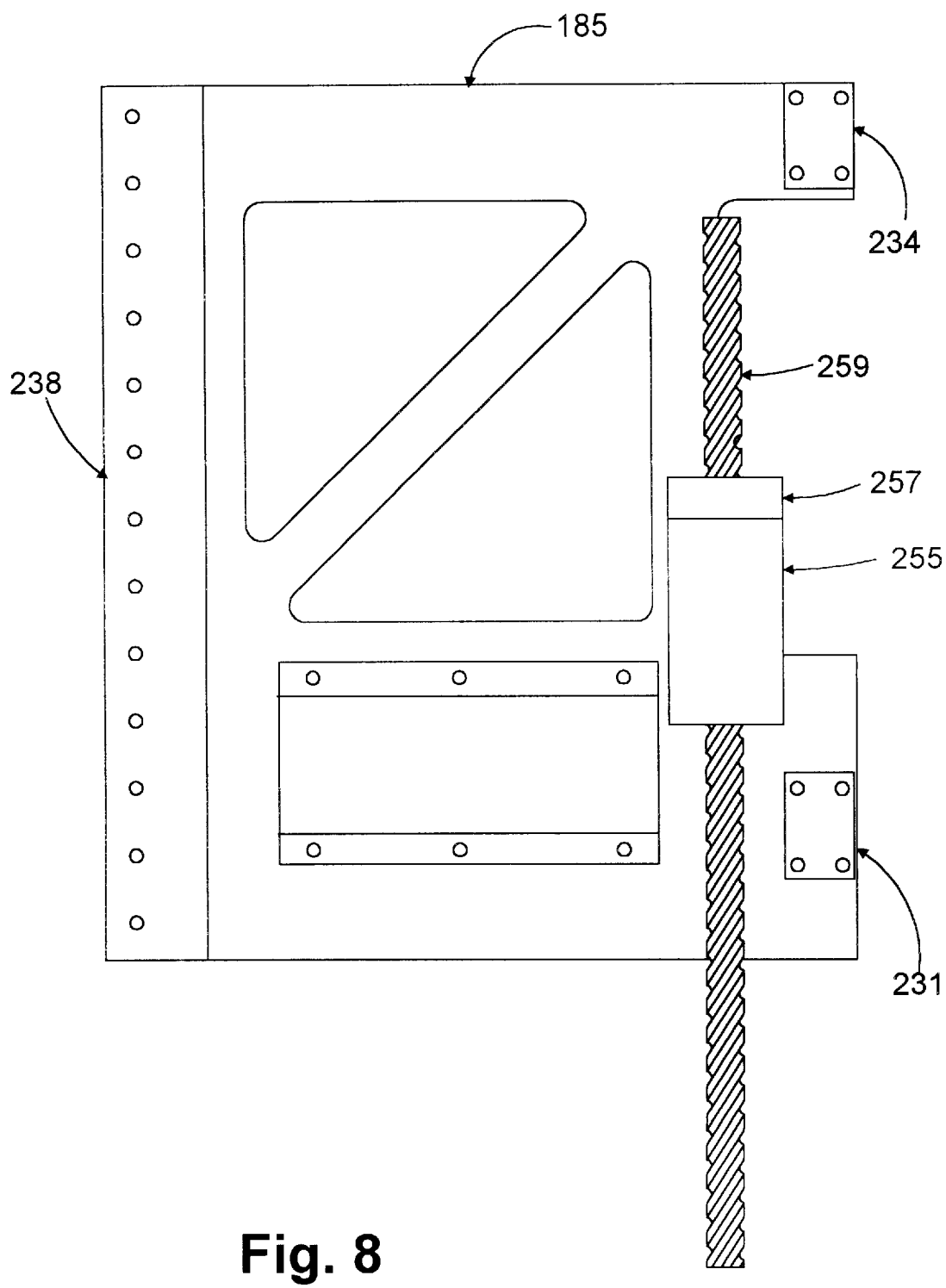
FIG. 8 is an exemplary view of the head plate including the hollow armature motor.

With reference to FIG. 8, shown is an exemplary view of the head plate 185 of the preferred embodiment is shown. The head plate 185 has much of the middle section cut out and discarded. This is done with the intent of reducing the weight of the head plate 185. This is also the case with the z-axis plate 241 (FIGS. 6 and 7). The hollow armature motor 255 has also been chosen as the core screw reduces weight by replacing a rotor assembly and other structure that may have been necessary. It also substantially eliminates backlash, which is an occurrence with motor driven mechanisms known to those skilled in the art. Thus in the preferred embodiment, the moving parts such as the head 115 on which is disposed the z-plate 241 is intentionally made of as light construction as possible so as to require less motivating force during operation.

To provide position feedback relative to the z-axis, the hollow armature motor 255 is fitted with a rotary encoder 257. The use of such position feedback devices as such is well known to those skilled in the art and will not be described in detail.

Referring back to FIG. 6, the payload 251 may consist of any number of devices. For example, any one of several end effectors 123 known to those skilled in the art such as devices for gripping, drilling, ratcheting, welding or other automated functions may be used with a part 125 (FIG. 1). The payload 251 in the preferred embodiment is gravity loaded in the sense that the downward force is provided by gravity. However, it would be possible that non-gravity loaded actuation may be employed as known to those skilled in the art.

Encoder

Turning back to FIG. 5, shown at the bottom of the drawing is the encoder 135 which is positioned to sense the feedback tape 139. The encoder 135 is attached to an encoder bracket 261 which in turn is attached to the head plate 185. The feedback tape 139 resides along the bottom edge of the beam 111. The encoder 135 provides position feedback information of the head 115 in the following manner. As the head 115 translates back and forth along the beam 111, the encoder 135 senses marks placed a predetermined distance apart on the feedback strip 139 and generates an electronic pulse for each mark that is sensed. By counting the pulses, and knowing the distance between each mark, the location of the head 185 can be determined in relation to the starting position of the move. In the preferred embodiment, the encoder 135 and feedback strip 139 are manufactured by Renishaw Inc. of Schaumburg, Ill., U.S.A. The encoder is model no. RGHX-2R-30 with encoder strip self-adhesive scale RGS-S A/9517/0004. The cited encoder 135 and feedback strip 139 provide a pulse per micron with a maximum detection speed of approximately two meters per second.

Vision System

Referring back to FIG. 1, the first, second and third vision units 143, 146 and 149 are shown in their viewing positions above the part bins 121, above the assembly platform 129, and below the head 115, respectively. In the preferred embodiment, these vision units are of the type described in U.S. Pat. No. 5,146,340 entitled "Image Data Reading and Processing Apparatus" issued to Dickerson et al. This document is expressly incorporated herein by reference in its entirety.

The vision units 143, 146 and 149 generally will acquire an image at a certain rate. The vision units 143, 146 and 149 will then process the image and provide position data of various features that the vision units 143, 146 and 149 have been programmed to look for. The position data can be relative to features of the assembly 129, part feeders 125 or end effectors 123 that make up the payload 251 (FIG. 6), as well as other physical features within the field of vision of the vision units 143, 146 and 149.

The field of view of the vision units 143, 146 and 149 is made larger or smaller depending on the desired accuracy. As those skilled in the art understand, the position data of the vision units 143, 146 and 149 is generated by examining the pixels in which an object may lie and counting the distance. If the field of view is smaller, then there will be more pixels per unit of area. This translates into greater resolution and precision in measurement. The foregoing discussion regarding the vision units 143, 146 and 149 is well understood by those skilled in the art.

If the vision units 143, 146 and 149 are configured for narrow tolerances, then the corresponding field of view will be smaller. In such a case, due to their limited field of view, the vision units 143, 146 and 149 would be positioned such that the part 125 to be grasped or the assembly platform 129 is within the field of view. In the preferred embodiment, where there are more than a single part bin 125, it is likely that more than vision units 143, 146 and 149 will be employed. It may be possible that a single vision unit 143, 146 and 149 would be capable of translating the necessary distance to view several different locations as in the case where a vision unit 143, 146 and 149 could be attached to the head 115 etc. The deciding fact as to whether a single or multiple vision units 143, 146 and 149 are used is within the understanding of one skilled in the art. Generally, the deciding factor is one of economics.

Finally, the vision units 143, 146 and 149 are powered by a twenty-four volt input and communicate serially with the computer 153 via a two wire twisted pair cables 161, 165 and 167. The communications protocol between the vision units 143, 146 and 149 and the computer 153 is generally known to those skilled in the art and will not be described in detail.

Computer Hardware

Turning once again to FIG. 1, included is a block diagram of electronics of the preferred embodiment. In the preferred embodiment, the computer 153 is a general purpose personal computer with a PENTIUM™ (Intel Corporation, USA) microprocessor. However, the functions of computer 153 may also be performed by any computer system that meets the speed and calculation requirements of the preferred embodiment. It would also be possible to operate many of the logical operations described in the present disclosure with dedicated digital logic or analog circuits. It is intended that these alternatives be expressly included in this disclosure. The specification and design of microprocessor based computing systems and digital or analog logic circuits Is, as described herein, an expedient well within the understanding of one skilled in the art.

Finally, an analog signal generated by the computer is sent to the amplifier motor 118 via power cable 169. The motor 118 may include an amplifier to create a signal that will drive the motor 118. The amplification of a signal as such is an expedient well known to those skilled in the art and will not be discussed in detail.

Control Software

Figure 9:
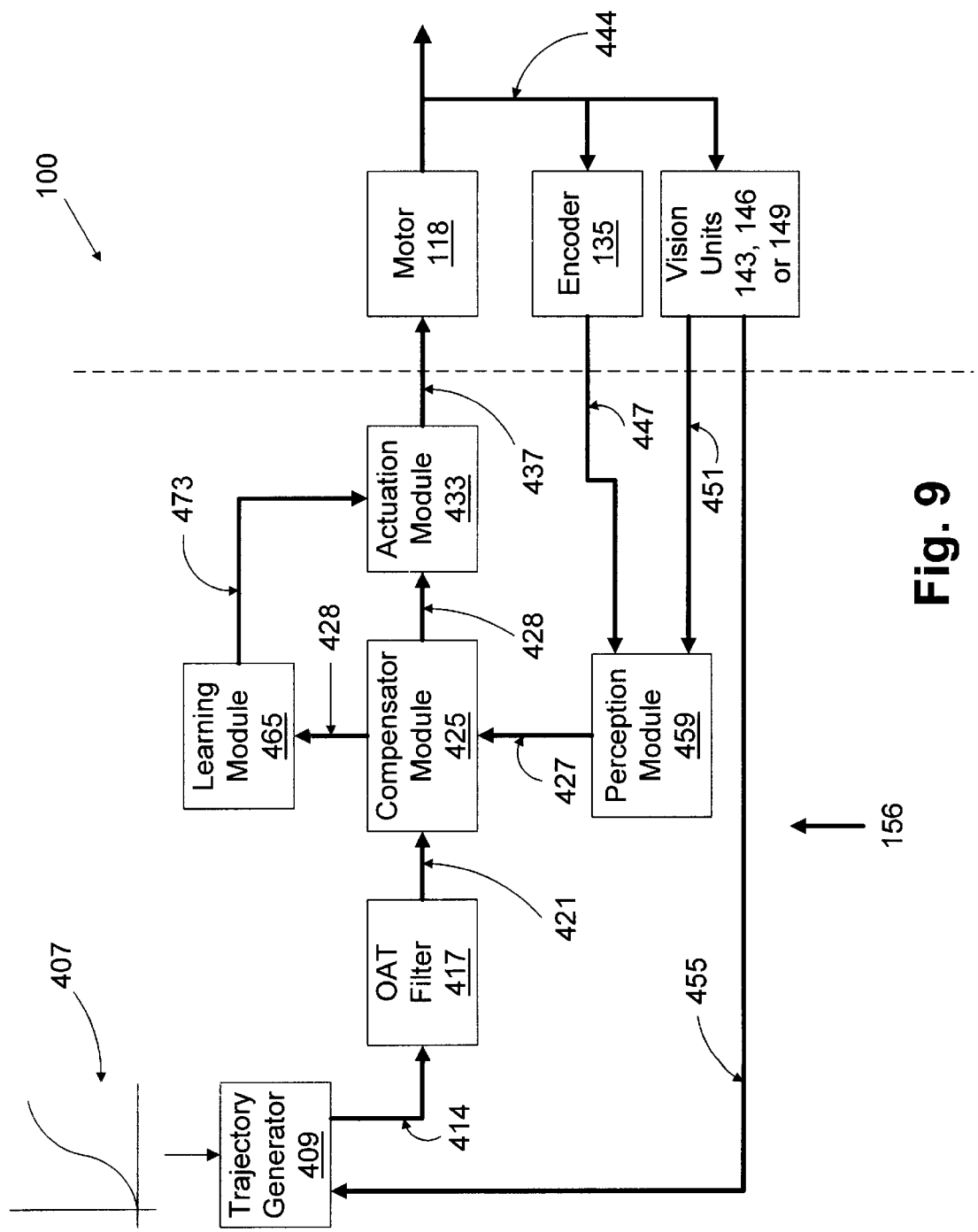
FIG. 9 is a block diagram of the control software and controlled components.

Turning to FIG. 9, shown is a block diagram of the control logic of the precision placement machine 100 which illustrates the details of the control software 156 (FIG. 1). Also included are the motor 118, the encoder 135 and the vision units 143, 146 and 149. First, a cursory description of the overall operation of the control software 156 will be given, and then a description of each particular software module will follow.

To begin, a nominal trajectory 407 is input into the control computer 153 where it is adjusted by the trajectory generator module 409, as needed. The resulting adjusted trajectory 414 is then processed by the optimal arbitrary time-delay filter 417. A filtered trajectory 421 is then sent to the compensator module 425 which, after also receiving feedback signal 427, generates a control signal 428. The control signal 428 is then sent to the actuation module 433 which in turn sends a motor output 437 to the motor 118.

The movement 444 due to the actuation of the motor 118 is sensed by both the encoder 135 and the vision units 143, 146 and 149. The encoder 135 and the vision units 143, 146 and 149 will relay encoder position data 447 and vision position data 451 to the perception module 459. The perception module 459 generates a feedback signal 461 which is sent to the compensator module 425 completing a control feedback loop as well understood by those skilled in the art.

Finally, the control signal 428 is also received by the learning module 465 which will generate a learned effort signal 473 which is sent to the actuation module.

The nominal trajectory 407 is generally a curve made of discrete values representing position versus time. The nominal trajectory 407 may be generated in many ways, including mathematical derivation or other means. In the preferred embodiment, a trajectory is generated based on a limited velocity and acceleration to be executed within a specific time period. The limits on velocity and acceleration are related to the maximum capabilities of the precision placement machine 100. The generation of nominal trajectories 407 as such are an expedient well known to those skilled in the art and will not be discussed in detail.

It should be noted, however, that a separate nominal trajectory 407 is generated for each significant movement to be made by the head 115 (FIG. 1) or with any significant change in the mass of the head 115 (FIG. 1) with an existing trajectory. The movements requiring a specific nominal trajectory 407 are distinguished from those in which an existing nominal trajectory 407 need only be altered, as will be discussed. Once generated, the nominal trajectories 407 may be stored in computer memory or generated in real time to be implemented by control software 156. Thus the control system would chose the particular trajectory to be implemented if necessary. The creation of software to chose stored or generate new nominal trajectories 407 is well within the understanding of one skilled in the art. With this basic overview, the control software 156 will be further explained.

Figure 10:
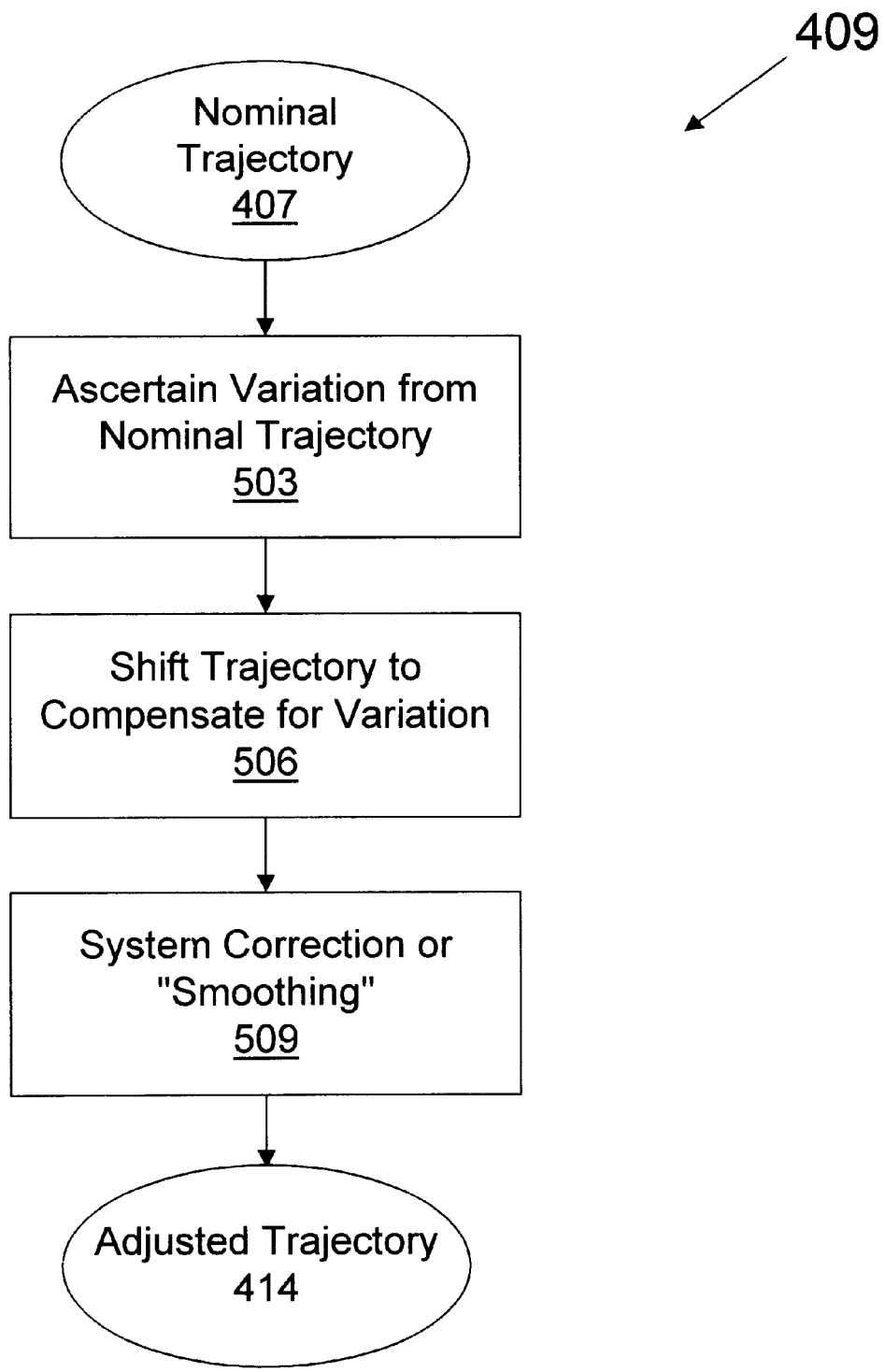
FIG. 10 is a flow diagram of the trajectory generator module of the control software.

Turning to FIG. 10, shown is a flow diagram of the trajectory generator 409. In the first step 503, the trajectory generator 409 determines the variation of actual distance to be traveled by the head 115 (FIG. 1) from the nominal trajectory 407. This is accomplished by obtaining data relating to the current position and the target position of the head 115 (FIG. 1) from the vision units 143, 146 and 149 (FIG. 1). This positioning information could also be obtained using other methods including laser sighting or other position sensing technology. Once the actual distance to be traveled is ascertained, the trajectory generator 409 can determine the variation from nominal trajectory 407 via a simple calculation.

In the second step 506, the nominal trajectory 407 is shifted to compensate for the variation. In essence, the trajectory curve is literally shifted up or down via a calculation. The shifting of trajectories as such is an expedient well understood by those skilled in the art.

The third step involves correcting for the error created by the shifting of the nominal trajectory 407. When the trajectory is shifted, the beginning value may be a step input which will cause an immediate error. This error is a common occurrence when shifting is employed and is therefore a common expedient understood by those skilled in the art. This error can be ignored if desired and the control software 156 will ultimately compensate. In such a case, this step is ignored. A second alternative is to employ "smoothing" techniques in which the error is made smooth by altering the trajectory curve as needed. Smoothing techniques as such are also an expedient well known to those skilled in the art.

At the conclusion of the trajectory generator 409, an adjusted trajectory 414 is generated.

Figure 11:
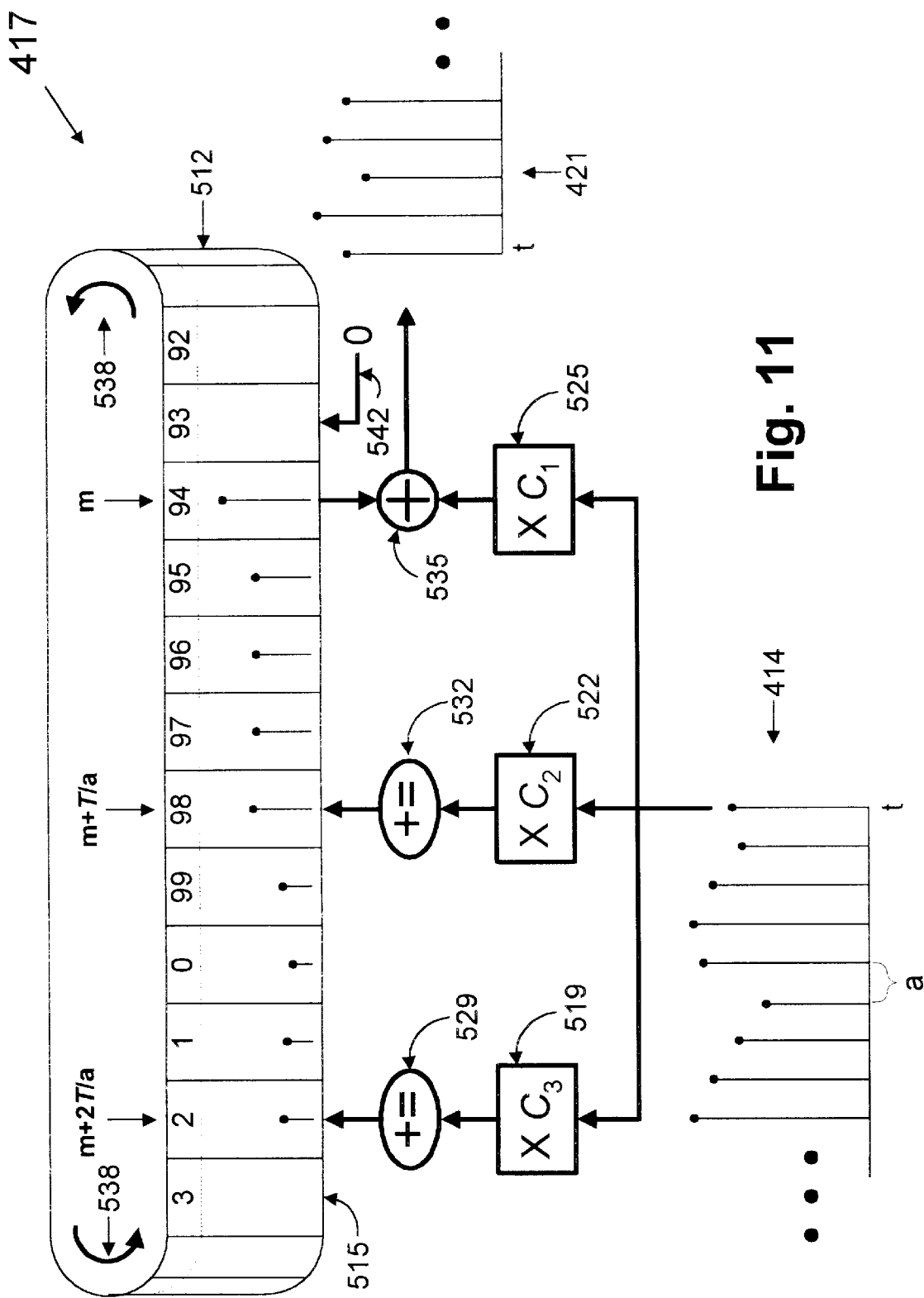
FIG. 11 is a graphical depiction of the software employed in the preferred embodiment to accomplish the optimal arbitrary time-delay (OAT) filter operation.

Turning next to FIG. 11, shown is a graphical depiction of an optimal arbitrary time-delay (OAT) filter 417 of the preferred embodiment. The OAT filter 417 employed in the preferred embodiment is the subject of the co-pending United States patent application entitled "Optimal Arbitrary Time-Delay (OAT) Filter and Method to Minimize Unwanted System Dynamics," Ser. No. 08/832,099, which was filed on the same day as this disclosure. This document is incorporated herein by reference in its entirety.

The OAT filter 417 is employed to minimize unwanted dynamics and vibration in the support structure 109 (FIG. 1) due to the adjusted trajectory 414. This is accomplished via the convolution of the adjusted signal 414 with the specified filter equation below, the derivation of which is covered in the previous referenced patent application docket no. 62002-1670. In the preferred embodiment, the OAT filter 417 is designed to address a single mode of vibration. The filter impulse response takes the general form $$f_{opt}(t) = \frac{1}{M}\delta(t) - \frac{2\cos\left(\omega_n\sqrt{1-\zeta^2}\ T\right)e^{-\zeta\omega_n T}}{M}\delta(t-T) + \frac{e^{-2\zeta\omega_n T}}{M}\delta(t-2T)$$

where M is a scaling factor equal to 1–2 cos ($\omega_n$ $\sqrt{1-\zeta^2}$T)$e^{-\zeta\omega_n T}$, $\omega_n$ is the natural frequency of the support structure 109 (FIG. 1), $\zeta$ is the damping ratio of the vibration, and T is an arbitrary time-delay. Thus for a single mode vibration, the filter coefficients are equal to $$\frac{1}{M},\ \frac{-2\cos\left(\omega_n\sqrt{1-\zeta^2}\ T\right)e^{-\zeta\omega_n T}}{M},\ \text{and}\ \frac{e^{-2\zeta\omega_n T}}{M},$$

respectively, where M is a scaling factor equal to 1–2 cos ($\omega_n$ $\sqrt{1-\zeta^2}$T)$e^{-\zeta\omega_n T}$+$e^{-2\zeta\omega_n T}$. The scaling factor M may be determined by another expression as known to those skilled in the art. These coefficients are defined as $C_1$, $C_2$ and $C_3$, respectively, for the discussion that follows.

The natural frequency $\omega_n$ and the damping ratio of the support structure 109 (FIG. 1) can be determined experimentally or derived mathematically. The determination of these factors as such is an expedient well understood by those skilled in the art.

The arbitrary time-delay T is not determined by the manipulation of any particular mathematical formulation or physical experimentation. It is a truly arbitrary variable limited only by the physical limitations of the precise placement machine 100 (FIG. 1). For instance, in the case of the preferred embodiment, the force demands on the motor 118 (FIG. 1) may exceed the capabilities of those components if the arbitrary time-delay is too small. On the other hand, if the arbitrary time-delay T is set too high, then the filtering function may be defeated as support structure 109 (FIG. 1) will experience unwanted movement in the time that it takes for the filter to operate.

Thus the specification of the arbitrary time-delay is up to one skilled in the art based on the system parameters and the desired motion to be achieved. For example, the available sampling rates of the computer control system may constrain the choice of the arbitrary time-delay. A suggested time-delay could be one quarter of a single period of the natural frequency $\omega_n$ of the support structure 109 (FIG. 1). Thus the only movement that will be experienced is one peak of the particular vibration at the time of one quarter of a single period of the natural frequency $\omega_n$ as is understood by those skilled in the art.

Once, the natural frequency $\omega_n$, the damping ratio, $\zeta$, and the arbitrary time-delay T are determined, the coefficients $C_1$, $C_2$ and $C_3$ of the filter are calculated. Note that where the physical characteristics such as mass or other factor of the precision placement machine 100 (FIG. 1) change, thereby changing the natural frequency $\omega_n$ and the damping ratio, $\zeta$, the coefficients will have to be recalculated based on the new parameters. This may occur, for example, when a different part 125 (FIG. 1) is picked up by the precision placement machine 100 (FIG. 1)

Note that the OAT filter 417 may do this recalculation in real time provided that the computer system 153 is provided with the sensory capability with which to determine changes in the natural frequency $\omega_n$ and the damping ratio, $\zeta$. In some applications, however, the precision placement machine 100 (FIG. 1) may perform two or more repeated controlled motions, each motion being performed multiple times. In such a case, it would be possible to store a number of "sets" of coefficients corresponding to each motion with particular physical characteristics calculated with a specified time-delay constant T Thus the coefficients $C_1$, $C_2$ and $C_3$ may be chosen from preprogrammed "sets" of coefficients to employ based on the predetermined movement to be performed.

In the preferred embodiment, the coefficients $C_1$, $C_2$ and $C_3$ of the filter employed are calculated from the predetermined natural frequency $\omega_n$, the damping ratio, $\zeta$, and the arbitrary time-delay T and are preprogrammed in to the OAT filter 417, In the graphical depiction of the OAT filter 417, shown is the graphical convolution of the filter coefficients $C_1$, $C_2$ and $C_3$ and the adjusted trajectory 414. The adjusted trajectory 414 is in digital form consisting of a string of discrete signal values as shown. Each discrete signal value is separated by time period a. After the convolution is performed, a similar filtered trajectory 421 is generated. The revolving array 512 is shown with specific memory locations 515 which are numbered from 0 to 99 respectively, although not all of the memory locations of the revolving array 512 are shown.

To understand the operation of the filter, the latest discrete control signal value is multiplied by the three coefficients in the multiplication functions 519, 522 and 525. The result of these multiplication operations is added with the values in the selected memory locations by sum-equal operations 529 and 532. The sum equal operation is a particular computer programming instruction which takes a value out of a memory location, sums that value with another chosen value, and then places the result back in that same memory location. After a particular discrete control signal value has been processed in this manner, the revolving array 512 is rotated 538 a single value and the next discrete control signal value is processed.

Note that the particular memory locations 515 to which the results of the multiplication functions 519, 522 and 525 are added are separated by a value equal to the arbitrary time-delay T divided by the time period a. Thus the memory locations at m, m-T/a, and m-2T/a hold values that ultimately separated in time by the arbitrary time-delay T.

Finally, the output signal 421 is created from the values held in the array that are a summation of the three coefficient multiplication functions 519, 522 and 525. This step occurs after the multiplication function 525 (with the coefficient $C_1$) takes place. After the multiplication function 525 takes place, the result is added with the value stored at m, which in this case is position 94 on the revolving array 512. The result is sent out as the filtered digital output signal 421. The final step involves placing a zero in the memory location after position m so that location is ready to be used again.

The digital filter operation that is depicted in FIG. 11 is not the only programming method by which the OAT filter 417 may be accomplished. Such other programming steps are expressly included herein. Generally the implementation of a digital filter as such is an expedient well known to those skilled in the art.

Figure 12:
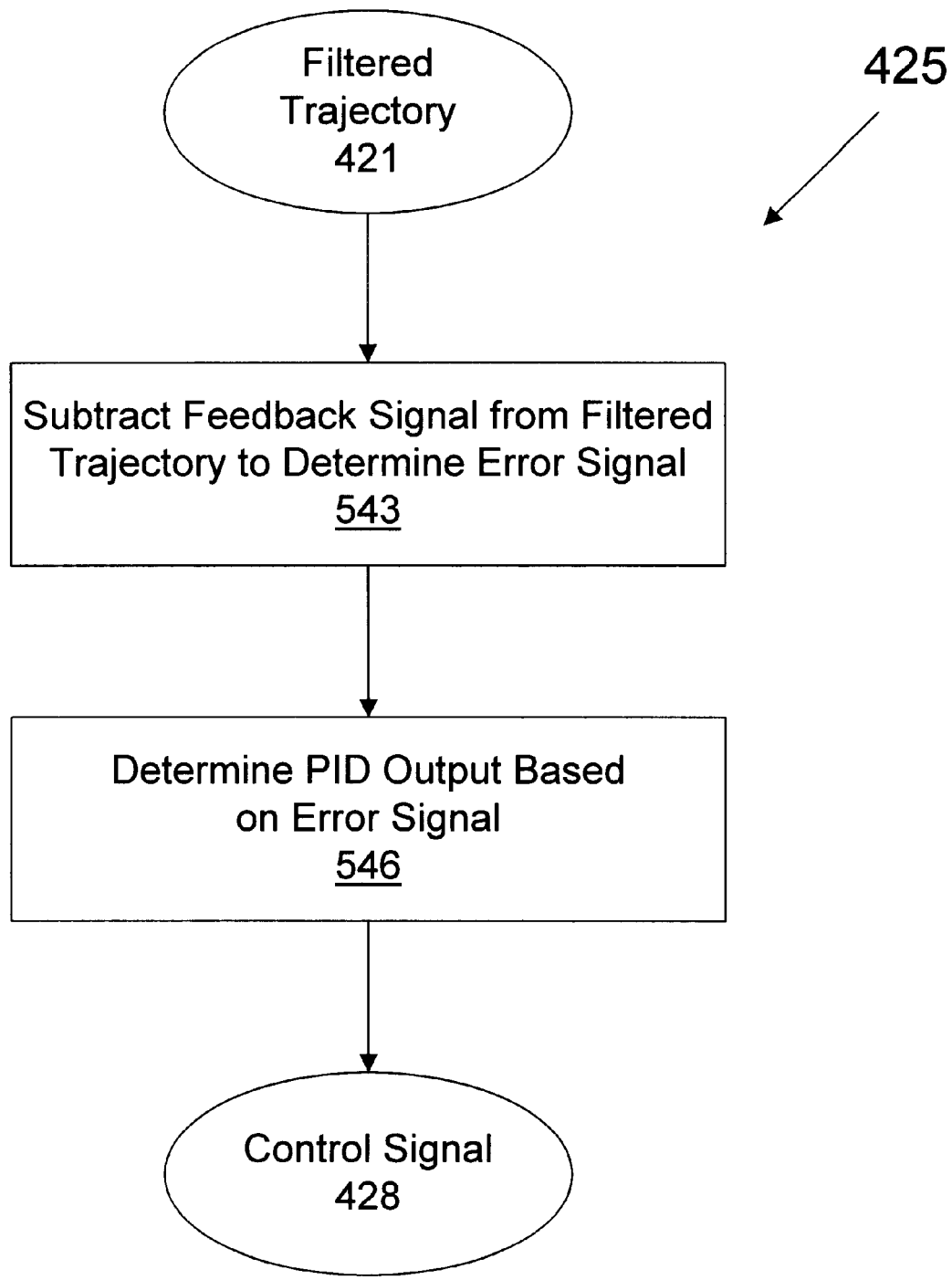
FIG. 12 is a flow diagram of the compensator module of the control software.

Referring next to FIG. 12, shown is a general flow diagram of the functions performed by the compensator module 425. In compensator module step 543, a summing function is performed where the filtered trajectory 421 is summed with the negative position feedback signal 427 from which a resulting error is determined. In step 546, the error signal is processed by a proportional-integral-derivative (PID) or other suitable controller program which outputs control signal 428. The precise operation of a program performing the PID as such is an expedient well known by those skilled in the art and will not be discussed here in detail.

Figure 13:
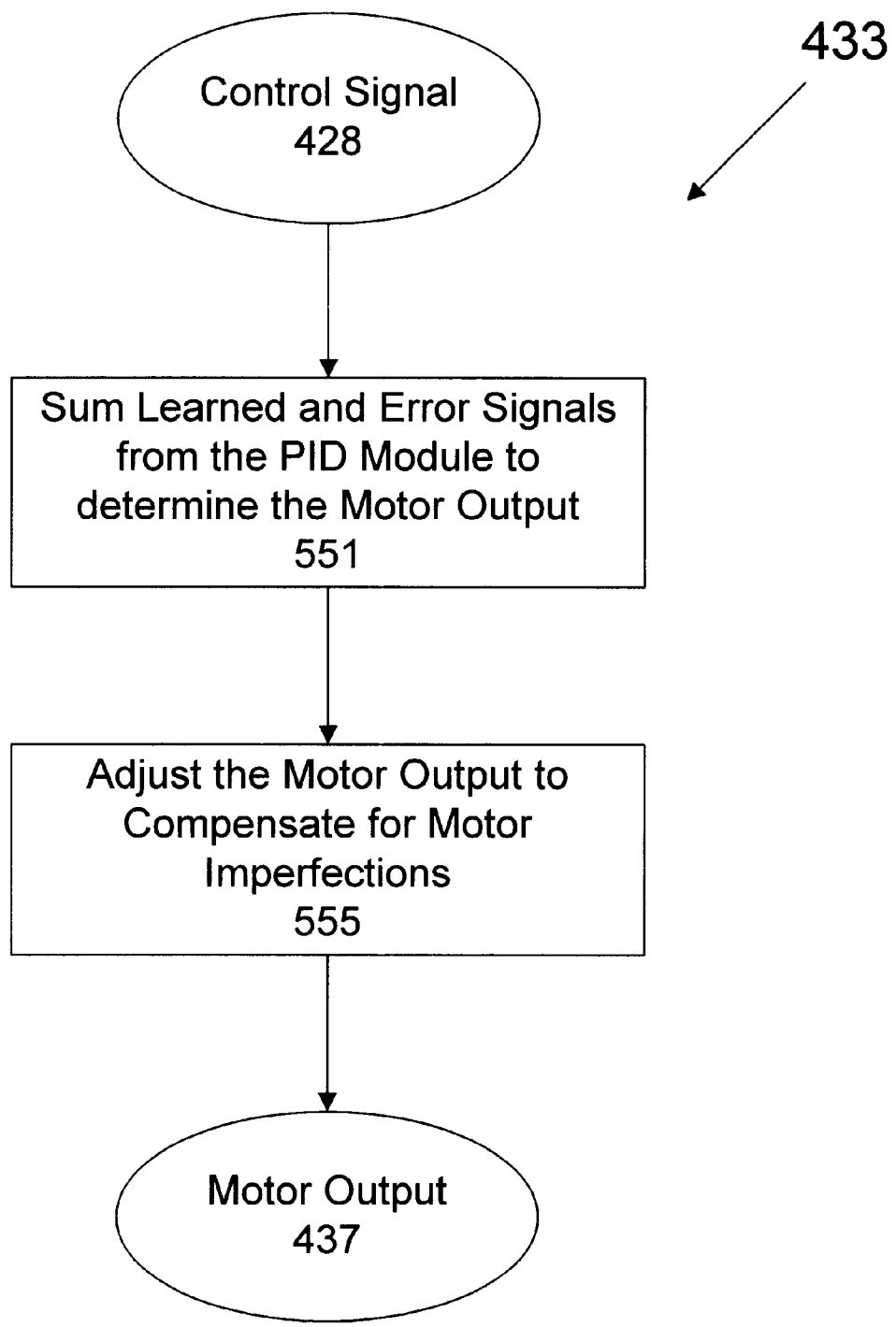
FIG. 13 is a flow diagram of the actuation module of the control software.

Turning to FIG. 13, shown is a general flow diagram of the functions performed by the actuation module 433. The first actuation module step 551 is to perform a summing operation, adding the learned signal and the PID error signal. The result of this addition is the motor output 437 to be sent to the motor 118.

The second actuation module step 555 involves the adjustment of the motor output 437 to compensate for motor imperfections etc. This function addresses the reality that the output torque of motor 118 is not always equal to the desired torque based on the input signal at a given instant of time due to the "ripple effect" which is an occurrence well known to those skilled in the art. The adjustment of the motor output 437 as such is an expedient understood by those skilled in the art.

Figure 14:
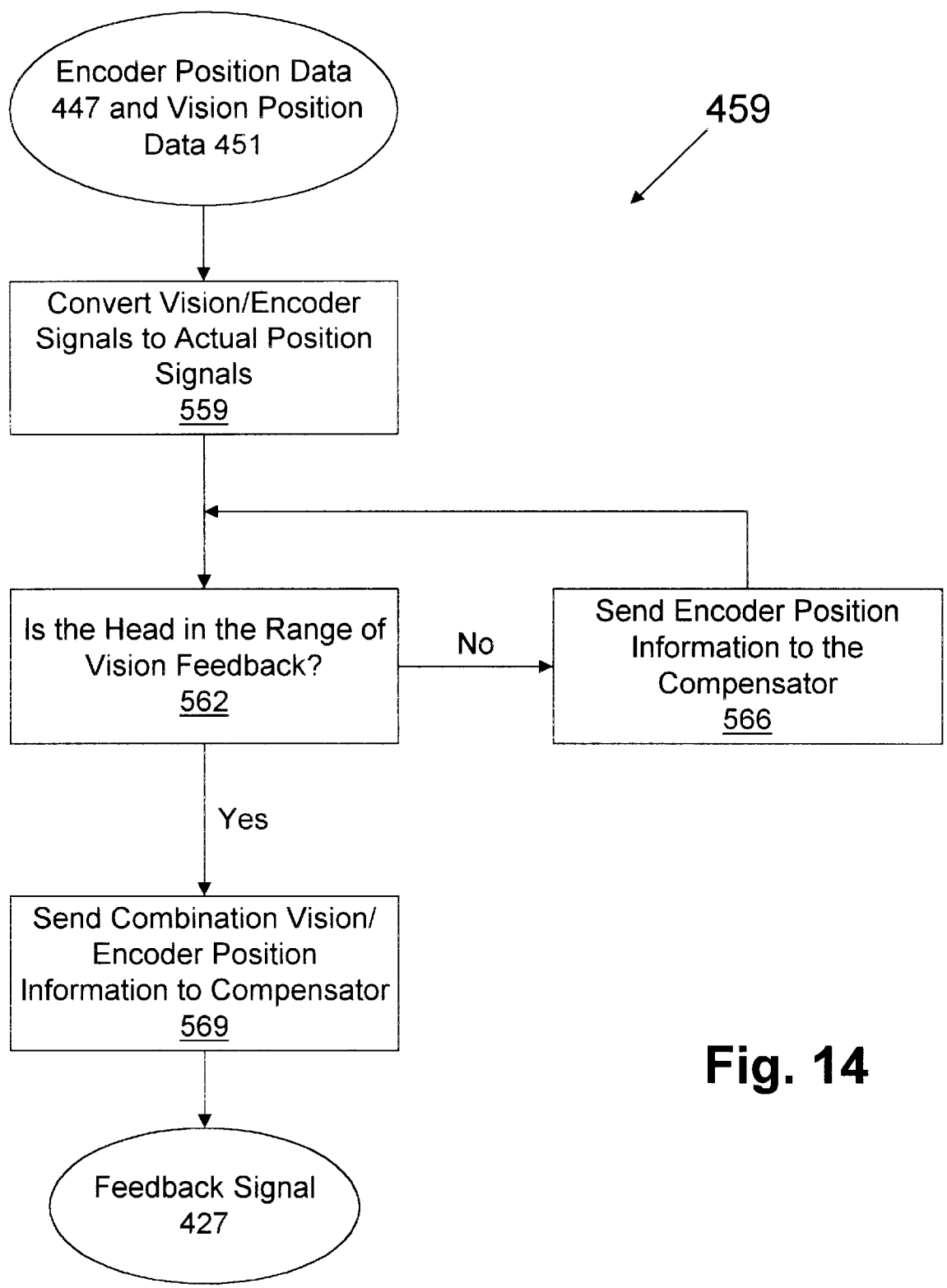
FIG. 14 is a flow diagram of the perception module of the control software.

Referring now to FIG. 14, shown is a general flow diagram of the functions performed by the perception module 459. The perception module 459 essentially determines the nature of the feedback signal 427 sent back to the compensator module 425 based upon the encoder position data 447 and the vision position data 451. In the first perception module step 559, the vision position data 451 and the encoder position data 447 are converted into digital signals which can be used by the compensator module 425. In the preferred embodiment, the encoder 135 (FIG. 1) will provide a pulse signal for every micron of movement. These pulse signals are received by the perception module 459 and the actual position is determined by summing the number of pulses that have occurred during the movement and multiplying them by the appropriate distance per pulse. In the preferred embodiment, this distance is one micron, but can be any suitable distance as determined by one skilled in the art.

The vision position data 451 is a digital value representing the actual position based on predetermined criteria as is known by those skilled in the art.

The second perception module step 562 occurs in which the determination is made as to whether the head 115 (FIG. 1) is in the range of the target vision unit to which the head 115 (FIG. 1) is traveling. This determination may be made by examining the position of the head 115 (FIG. 1) as known by encoder position data 447 or by examining whether the head is actually seen by the target vision unit.

Assuming the head is not yet within range of the target vision system, the perception module step 566 will cause the feedback signal 427 to be comprised of position information from the encoder 135 (FIG. 1) alone. Once the head is within range of the target vision sensor, the perception module step 569 will determine the feedback signal 427 from either the encoder 135 or the vision units 143, 146, or 149, or a combination of position data from both.

Figure 15:
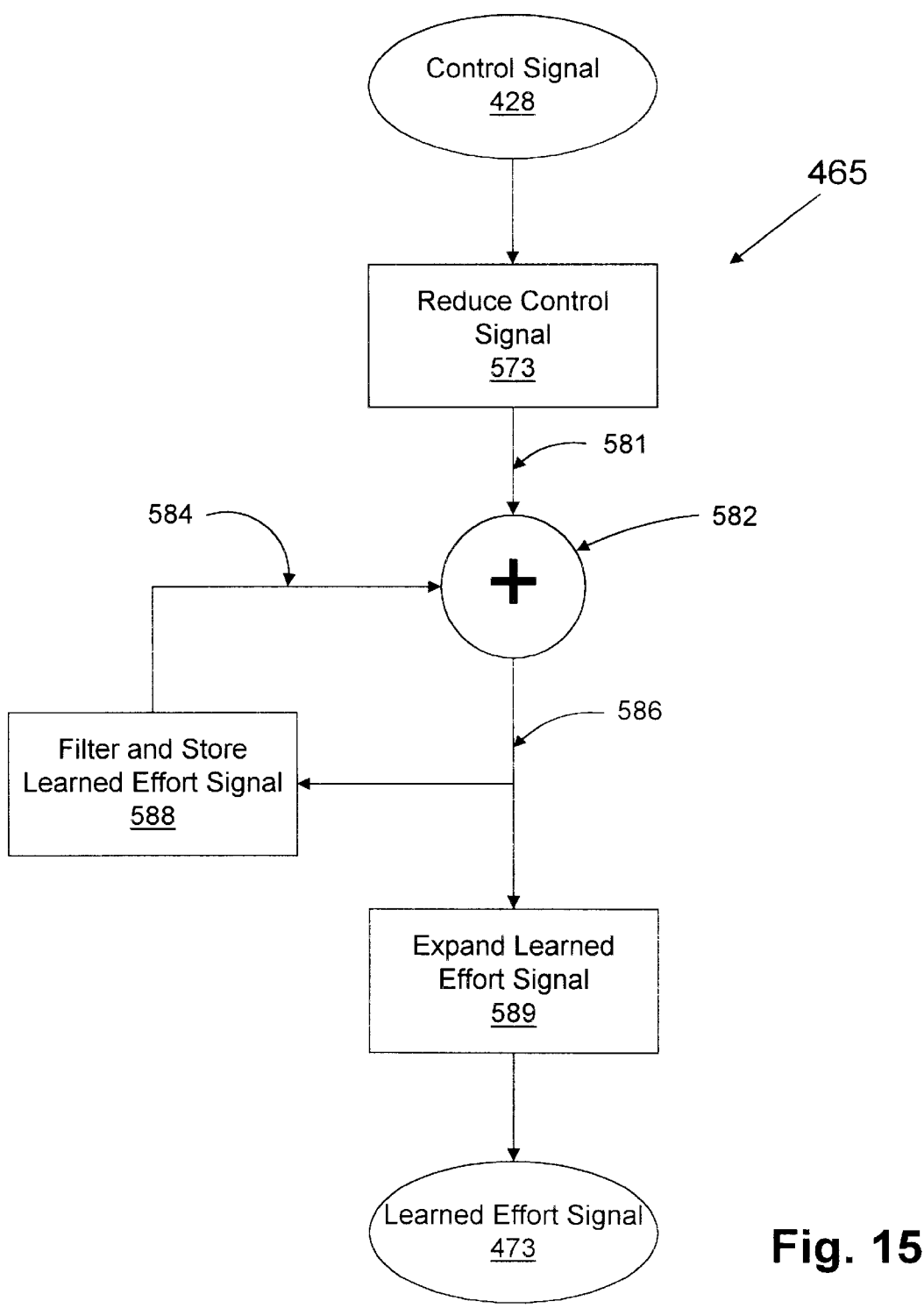
FIG. 15 is a flow diagram of the learning module of the control software.

Turning to FIG. 15, shown is a general flow diagram of the functions performed by the learning module 465. In the first learning module step 573, the number of samples per unit time of the control signal 428 is reduced to a predetermined number of discrete signal values, resulting in reduced control signal 581. For purposes of the following discussion, the control signal 428 is represented by e[k] and the reduced control signal 581 is denoted by $\bar{e}[\bar{k}]$ where k is the time index of the control signal 428, and $\bar{k}$ is the time index of the reduced control signal 581. The mathematical expression that shows the relationship between e[k] and $\bar{e}[\bar{k}]$ is specified as $$\bar{e}[\bar{k}] = \frac{1}{m^2}\sum_{j=1}^{m} je\left[m(\bar{k}-2)+j\right] + \frac{1}{m^2}\sum_{j=1}^{m-1}(m-j)e\left[m(\bar{k}-1)+j\right] \quad (1.0)$$

where m is the ratio of the number of samples of the control signal 428 to the number of samples of the reduced control signal 581 per the same unit of time. The variable m can also be thought of as the conversion factor of the two time indexes. In the preferred embodiment, the number of samples per single movement of the head 115 (FIG. 1) is as calculated by equation 1.0 is approximately two hundred.

Figure 16:
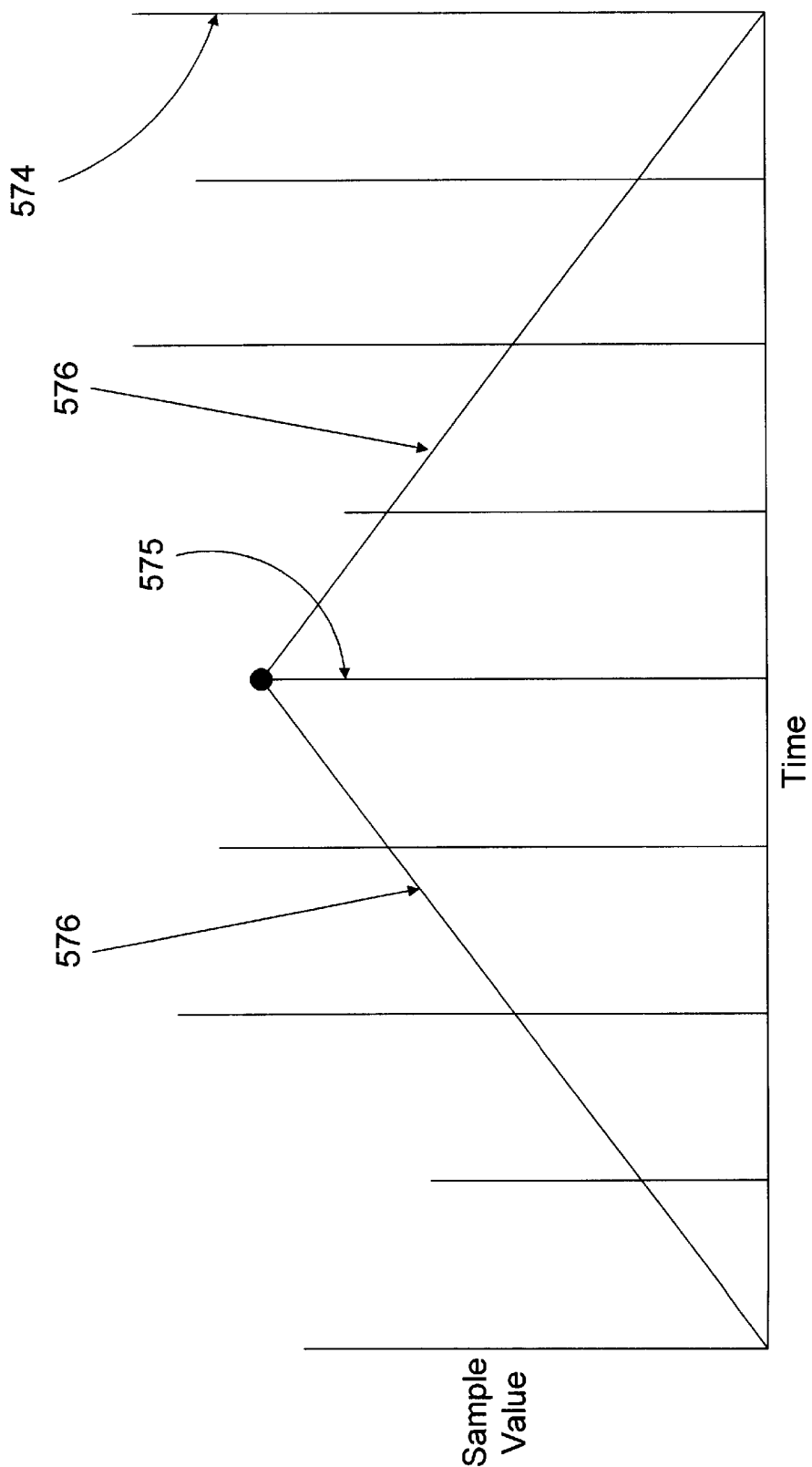
FIG. 16 is a illustration of the weighted average function performed to achieve sample reduction in the learning module of the control software.

The expression 1.0 represents the weighted reduction of the control signal 428. To explain this further, reference is made to FIG. 16 which shows discrete signal samples 574 with the center sample 575. Weighting lines 576 indicate the particular weighting factor with which each sample 574 will be multiplied where the maximum weight of the peak at center sample 575 is one. To take a weighted average, the samples closest to the peak of the weighting lines 576 will be multiplied by a greater factor while those at the ends where the weighting lines meet the axis will be multiplied by a small factor. In the case of FIG. 16, the value of the index ration m is four, the value of sample 575 is multiplied by 1, the value of sample 577 is multiplied by 0.75, the value of the sample 578 is multiplied by 0.5, and the value of sample 579 is multiplied by 0.25. The results of these multiplications are added and the average is taken, resulting in a single representative sample.

The resulting reduced control signal 581 is then summed, sample for sample, at summing junction 582 with a previously stored, filtered learned effort signal 586 resulting in a learned effort signal 588. This summation is performed using the following expression $$\bar{u}[k+N-3] = \bar{u}_f[k-3] + \gamma \bar{e}[k], \ 0 < \gamma < 1 \quad (2.0)$$

where $\bar{u}_f[k]$ is the filtered learned effort signal 586, $\bar{u}[k]$ is the learned effort signal 588, N is the number of learned efforts per single movement, and γ is the gain which determines the convergence speed of the learning module 465. In other words, the gain γ will determine what percentage of the reduced control signal 581 will be added to the filtered learned effort signal 586. If the gain γ is too high, the system will become unstable. If it is set too low, then the convergence will take too long and the learning control module 465 will have no effect.

The learned effort signal 586 is the filtered using a low pass filter and stored at step 588. The low pass filtering function is performed using the following equation $$\bar{u}_f[k] = \sigma \bar{u}_f[k-1] + (1-\sigma)\bar{u}[k], \ 0 < \sigma < 1 \quad (3.0)$$

which is a first order filter as known to those skilled in the art, and will not be discussed in detail. The resulting filtered learned effort signal 584 is stored in memory to be summed with the reduced control signal 581 at summing junction 582.

Note that the filtered learned effort signal 584 can be stored with a minimum of memory due to the reduced number of samples in the signal. This resulted from the reduction of the control signal 428. Consequently, the cost of memory devices needed to store the number of values at the original sampling rate is avoided. Also, the reduction of the control signal 428 in this manner serves performs a filtering function in which any erratic behavior in the control signal 428 is eliminated.

Finally, at expansion step 589, the number of samples per unit time of the learned effort signal is expanded by adding samples to the signal so that it will match the number of samples per unit time of the original control signal 428. This is accomplished through the linear interpolation of missing samples as determined by the expression $$u[k] = \frac{j}{m}\bar{u}[\bar{k}] + \left(1 - \frac{j}{m}\right)\bar{u}[\bar{k}-1], \ j = k - mk. \quad (4.0)$$

Figure 17:
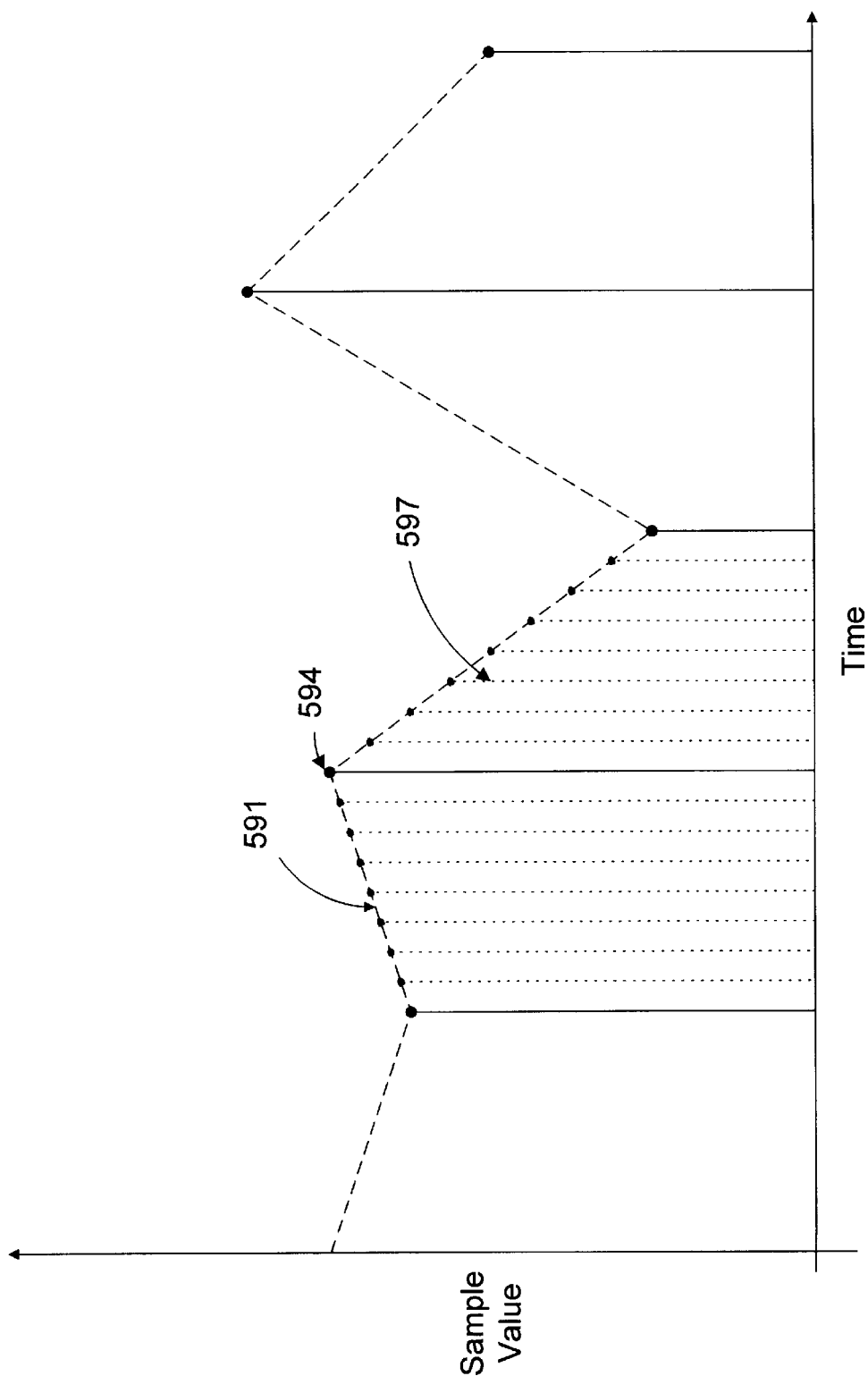
FIG. 17 is a illustration of the sample reconstruction function performed to recreate the filtered trajectory in the learning module of the control software.

This linear interpolation is shown graphically in FIG. 17. In performing this function, the learning module program will create a line 591 between each consecutive existing sample 594 of the learned effort signal 586. The missing samples 597 are then calculated and interposed between the existing samples 594. The resulting expanded learned effort signal 473 is sent to the actuation module 433 (FIG. 9).

By virtue of the steps described above, the learning module 465 will create an expanded learned effort signal 473 that will compensate for repeated errors in the dynamic system. In the present invention, the operation of the learning module as described previously is for repeated motions of the same general trajectory so that the filtered learned control signal 584 stored in memory may converge upon the repeated errors seen those motions. If the motions performed vary widely, then the learning control will not converge on the repeated errors as the errors will not generally be repeated due to the differing trajectories. Thus for operations with do not repeat themselves, the leaning control will be ineffective.

The present invention will allow machines performing repeated motions to operate at significantly increased speed. In particular, in various applications such as the present embodiment, when the repeated motion is executed at the higher speeds using only a standard fine tuned PID loop known to those skilled in the art, a significant maximum error in the motion will be realized. When the control software 156 (FIG. 9) of the present invention is employed, the error previously seen with the PID loop is reduced by a factor of 10 or more. Thus, for a given acceptable level of error, the present invention will increase the bandwidth, and thereby the speed of operation of the repeated motion to a point where the corresponding PID error would be at least 10 times greater.

The principles disclosed herein are not limited in scope to the structure of the assembly machine of FIGS. 1 through 11. In fact, the same control principles apply to a machine which moves in an axial fashion, or a combination of both linear and axial motion. Such variations from the embodiment illustrated in the instant application are intended to be included in the scope of the present invention.

Many variations and modifications may be made to the preferred embodiment of the invention without departing substantially from the spirit and principles of the invention. All such modifications and variations are intended to be included herein within the scope of the present invention, as defined by the following claims.

Finally, any "means" element in the claims hereafter is intended to specify any structure, device, material, composition, or act for performing the function(s) or operation(s) indicated in connection with said means.

Therefore, the following is claimed:

1. An apparatus for achieving precision motion, comprising:
    a support structure capable of a degree of compliance;
    a manipulator included within said support structure, said manipulator capable of a controlled motion relative to a fixed point, said degree of compliance capable of causing extraneous displacement of said manipulator relative to said fixed point;
    a force generating element responsive to a control signal which causes said controlled movement of said manipulator; and
    a control system which generates said control signal thereby positioning said manipulator within a predetermined position tolerance, wherein said extraneous displacement may be greater in magnitude than said predetermined tolerance.

2. The apparatus of claim 1, wherein said support structure is made of component parts which are constructed to dimensional tolerances that are greater than said predetermined position tolerance.

3. The apparatus of claim 1, wherein said support structure is non-rigid, capable of deformation.

4. The apparatus of claim 1, wherein said support structure includes moving parts, said moving parts being substantially equal in weight to a payload.

5. The apparatus of claim 1, wherein the maximum position error of said manipulator experienced during said controlled motion caused by said control signal generated by said control system is substantially ten times less than the maximum position error of said manipulator as controlled by a well tuned standard PID controller.

6. The apparatus of claim 1 wherein said controlled motion is repetitive.

7. The apparatus of claim 1, wherein said control system further comprises a filter to minimize the generation of unwanted dynamics in said support structure created by said control signal.

8. The apparatus of claim 1, wherein:

said controlled motion is repetitive; and said control system further comprises a learned effort signal generator generating a learned effort signal that compensates for repeated errors experienced in said controlled motion.

9. The apparatus of claim 1, wherein said control system further comprises a position feedback generator creating a position feedback signal from a plurality of feedback sensors.

10. The apparatus of claim 1, wherein said control system further comprises a trajectory generator creating a desired position trajectory by altering a predetermined trajectory to achieve said desired position trajectory, said desired position trajectory determined by at least one position sensing device, wherein said control signal is generated from said desired position trajectory.

11. The apparatus of claim 6, wherein said control system further comprises:

a filter to minimize the generation of unwanted dynamics in said support structure created by said control signal; and a learned effort signal generator generating a learned effort signal that compensates for repeated errors experienced in said controlled motion.

12. The apparatus of claim 11 wherein said control signal and said learned effort signals are digital signals with a first sample rate.

13. The apparatus of claim 12, wherein said learned effort signal generator further includes:

a sample rate reducer producing a reduced control signal at a second sample rate, said second sample rate being a predetermined value lower than said first sample rate;

a reduced learned effort signal generator, said generator creating a reduced learned effort signal at said second sample rate from said reduced control signal and a filtered effort signal;

a low pass filter creating said filtered effort signal by filtering said reduced learned effort signal; and a signal restorer generating said learned effort signal at said first sample rate from said reduced learned effort signal.

14. The apparatus of claim 13, wherein said sample rate reducer produces said reduced control signal by taking the weighted average of said control signal.

15. The apparatus of claim 13, wherein said signal restorer generates said learned effort signal through the linear interpolation of said reduced learned effort signal.

16. The apparatus of claim 11, wherein said control system further comprises a position feedback generator creating a position feedback signal from a plurality of feedback sensors.

17. The apparatus of claim 11, wherein said control system further comprises a trajectory generator creating a desired position trajectory by altering a predetermined trajectory to achieve said desired position trajectory, said desired position trajectory determined by at least one position sensing device, wherein said control signal is generated from said desired position trajectory.

18. The apparatus of claim 17, wherein said position sensing device further comprises a vision device.

19. The apparatus of claim 17, wherein said position sensing device further comprises an encoder.

20. The apparatus of claim 16, wherein said plurality of feedback sensors further includes a vision unit and an encoder.

21. An apparatus for achieving precision motion, comprising:

a support structure capable of a degree of compliance;

a manipulator included within said support structure, said manipulator capable of a repetitive controlled motion relative to a fixed point, said degree of compliance capable of causing extraneous displacement of said manipulator relative to said fixed point;

a force generating means for causing said controlled movement of said manipulator in response to a control signal; and a control means for generating said control signal thereby positioning said manipulator within a predetermined position tolerance, wherein said extraneous displacement may be greater in magnitude than said predetermined tolerance.

22. The apparatus of claim 21, wherein said control means further comprises:

a first filter means for processing said control signal, thereby minimizing the generation of unwanted dynamics in said support structure; and a learning means for creating a learned effort signal that compensates for repeated errors experienced in said controlled motion.

23. The apparatus of claim 22, wherein said control means further comprises a trajectory generating means for creating a desired position trajectory by altering a predetermined trajectory to achieve said desired position trajectory, said desired position trajectory determined by a position sensing means, wherein said control signal is generated from said desired position trajectory.

24. The apparatus of claim 22, wherein said control signal and said learned effort signal are digital signals with a first sample rate.

25. The apparatus of claim 24, wherein said learning means further includes:

a first means for producing a reduced control signal at second sample rate, said second sample rate being a predetermined level lower than said first sample rate;

a second means for creating a reduced learned effort signal at said second sample rate from said reduced control signal and a filtered effort signal;

a second filter means for creating said filtered effort signal by filtering said reduced learned effort signal; and a third means for generating said learned effort signal at said first sample rate from said reduced learned effort signal.

26. The apparatus of claim 25, wherein said first means produces said reduced control signal by taking the weighted average of said control signal.

27. The apparatus of claim 25, wherein said third means generates said learned effort signal through the linear interpolation of said reduced learned effort signal.

28. The apparatus of claim 22, wherein said control system further comprises feedback means for generating a position feedback signal from a plurality of position feedback sensors.

29. The method of controlling the repeated movement of a manipulator, comprising the steps of:

connecting the manipulator to a support structure, the manipulator capable of repeated movement, the support structure capable of a degree of compliance;

generating a control signal;

controlling an actuator based on said control signal, said actuator causing the controlled motion of said manipulator; and positioning said manipulator within a predetermined positioning tolerance, said degree of compliance being greater in magnitude than the predetermined positioning tolerance.

30. The method of claim 29, wherein the step of generating said control signal further comprises the steps of:

generating a desired position trajectory from which said control signal is generated;

minimizing the generation of unwanted dynamics in said support structure by filtering said desired position trajectory; and compensating for repeated errors in the controlled movement of said manipulator by creating a learned effort signal based on said control signal, said learned effort signal being used to control the movement of said manipulator in addition to said control signal.

31. The method of claim 30, wherein the step of compensating for repeated errors further comprises the steps of:

reducing the original sample rate of said control signal to a predetermined sample rate, thereby generating a reduced control signal;

generating a reduced learned effort signal based on a previously stored, filtered learned effort signal and said reduced control signal;

generating a filtered learned effort signal based on said reduced learned effort signal, and storing said filtered learned effort signal in memory; and generating a learned effort signal with a sample rate equal to that of the original sample rate of said control signal by restoring the sample rate of said reduced learned effort signal.

32. The method of claim 31, wherein the step of reducing the original sample rate of said control signal further comprises the step of taking the weighted average of said control signal at said original sample rate.

33. The method of claim 31, wherein the step of generating a learned effort signal with a sample rate equal to that of the original sample rate of said control signal further comprises the step of generating said learned effort signal through the linear interpolation of said reduced learned effort signal.

34. The method of claim 30, wherein the step of minimizing the generation of unwanted dynamics in said support structure by filtering said desired position trajectory further comprises the steps of:

calculating a first coefficient $C_1$ where $C_1=1/M$, where M is a scaling factor;

calculating a second coefficient $C_2$, where $$C_2 = \frac{2\cos\left(\omega_n \sqrt{1-\zeta^2}\ T\right) e^{-\zeta\omega_n T}}{M},$$

$\omega_n$ equals the natural frequency of said support structure, $\zeta$ equals the damping ratio of said support structure, and T equals a arbitrary time-delay not equal to zero;

calculating a third coefficient $C_3$ where $$C_3 = \frac{e^{-2\zeta\omega_n T}}{M};$$

and filtering said desired position trajectory u(t) using a digital filter in the form $x(t)=C_1 u(t)+C_2 u(t-T)+C_3 u(t-2T)$, where x(t) is the filtered position trajectory output.

35. The method of claim 30, further including the step of generating actual position information from a plurality of position feedback sensors from which said desired position trajectory is determined.

36. The method of claim 34, wherein the step of generating actual position information further comprises the steps of:

generating position information with the use of vision units; and generating position information with the use of an encoder.

* * * * *

United States Patent And Trademark Office
CERTIFICATE OF CORRECTION

PATENT NO. : 5,946,449
DATED : August 31, 1999
INVENTOR(S): Dickerson et al.

It is certified that error appears in the above-identified patent and that said Letters Patent is hereby corrected as shown below.

Column 2, line 5 delete the second occurrence of "is".
Column 2, line 6 delete "located".
Column 6, line 37 delete "dimensional bear-" and insert therefor --dimension track--.
Column 6, line 38 delete "ing".
Column 6, line 42 delete "dimensional bearing" and insert therefor --dimension track--.
Column 6, line 45 delete "dimensional bearing" and insert therefor --dimension track--.
Column 6, line 60 delete "two" and insert therefor --single--.
Column 6, line 61 delete "dimensional" and insert therefor --dimension--.
Column 6, line 62 insert -- four dimension-- between "the" and "track".
Column 7, line 47 insert -- four dimension-- between "the" and "track".
Column 7, line 48 insert -- four dimension-- between "the" and "track".
Column 9, line 67, delete "amplifier".
Column 10, line 28 delete "461" and insert therefor --427--.
Column 11, line 27 delete "the co-pending".
Column 11, line 28 delete "application".
Column 11, line 38 delete "application docket no. 62002-".
Column 11, line 39 delete "1670".
Column 15, line 34 delete "serves".
Column 18, line 38 before "second" insert --a--.
Column 20, line 14 delete "the" and insert therefor --a--.

United States Patent And Trademark Office
CERTIFICATE OF CORRECTION

PATENT NO. : 5,946,449
DATED : August 31, 1999
INVENTOR(S): Dickerson et al.

It is certified that error appears in the above-identified patent and that said Letters Patent is hereby corrected as shown below.

In column 12, line 26 delete " $C_{1,c^2}$ " and insert therefor --$C_1$, $C_2$--.

Signed and Sealed this

Third Day of April, 2001

*Attest:*

NICHOLAS P. GODICI

*Attesting Officer*    *Acting Director of the United States Patent and Trademark Office*